United States Patent
Kobayashi et al.

(10) Patent No.: US 11,822,341 B2
(45) Date of Patent: Nov. 21, 2023

(54) CONTROL DEVICE, CONTROL METHOD, AND MOBILE OBJECT TO ESTIMATE THE MOBILE OBJECT'S SELF-POSITION

(71) Applicant: SONY CORPORATION, Tokyo (JP)

(72) Inventors: Dai Kobayashi, Tokyo (JP); Ryo Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 297 days.

(21) Appl. No.: 16/956,664

(22) PCT Filed: Dec. 14, 2018

(86) PCT No.: PCT/JP2018/046018
§ 371 (c)(1),
(2) Date: Jun. 22, 2020

(87) PCT Pub. No.: WO2019/130843
PCT Pub. Date: Jul. 4, 2019

(65) Prior Publication Data
US 2020/0402256 A1    Dec. 24, 2020

(30) Foreign Application Priority Data
Dec. 28, 2017    (JP) .................. 2017-253150

(51) Int. Cl.
*G06T 7/73*    (2017.01)
*G05D 1/02*    (2020.01)
(Continued)

(52) U.S. Cl.
CPC ............ *G05D 1/0251* (2013.01); *G01S 17/42* (2013.01); *G01S 17/89* (2013.01); *G06F 18/22* (2023.01);
(Continued)

(58) Field of Classification Search
None
See application file for complete search history.

(56) References Cited

U.S. PATENT DOCUMENTS 9,632,504 B1 * 4/2017 Watts .................. G05D 1/0231
2001/0055063 A1    12/2001 Nagai et al.
(Continued)

FOREIGN PATENT DOCUMENTS

JP    11-219435 A    8/1999
JP    2007-155699 A    6/2007
(Continued)

OTHER PUBLICATIONS

International Search Report and Written Opinion of PCT Application No. PCT/JP2018/046018, dated Mar. 19, 2019, 09 pages of ISRWO.
(Continued)

*Primary Examiner* — Steven Z Elbinger
(74) *Attorney, Agent, or Firm* — CHIP LAW GROUP

(57) ABSTRACT

Provided are a control device, a control method, and a mobile object that enable distinction among positions and accurate estimation of a self-position even in an environment where different positions include many similar feature amounts in surroundings and are thus likely to be erroneously detected as being the same position. In accordance with a place corresponding to the self-position, an image feature amount is extracted from an image of surroundings to which a mask has been added on the basis of a place-related non-feature portion representing an area, in the image of the surroundings, that is not useful for identifying the self-position, and the image feature amount and positional information regarding the self-position are associated with each other and registered in a position/image feature amount database (DB).

19 Claims, 17 Drawing Sheets

(51) Int. Cl.
  *G01S 17/42* (2006.01)
  *G01S 17/89* (2020.01)
  *G06F 18/22* (2023.01)

(52) U.S. Cl.
  CPC ...... *G06T 7/74* (2017.01); *G06T 2207/10012* (2013.01); *G06T 2207/30252* (2013.01)

(56) References Cited

U.S. PATENT DOCUMENTS

| | | | |
|---|---|---|---|
| 2007/0150097 A1 | 6/2007 | Chae et al. | |
| 2014/0005883 A1* | 1/2014 | Kidney | G01M 17/007 701/34.4 |
| 2014/0085205 A1* | 3/2014 | Kim | G06F 3/03544 345/163 |
| 2016/0003637 A1* | 1/2016 | Andersen | H04L 12/1827 701/519 |
| 2016/0337601 A1* | 11/2016 | Lee | H04N 13/271 |
| 2017/0293820 A1* | 10/2017 | Sawada | G06V 20/63 |
| 2018/0079085 A1* | 3/2018 | Nakata | B25J 9/1697 |

FOREIGN PATENT DOCUMENTS

| | | | | |
|---|---|---|---|---|
| JP | 2009-68852 A | 4/2009 | | |
| JP | 2010-033447 A | 2/2010 | | |
| JP | 2010219573 A | 9/2010 | | |
| JP | 2011-022157 A | 2/2011 | | |
| JP | 2011-22157 A | 2/2011 | | |
| JP | 2011022157 A * | 2/2011 | ............. | G01S 11/12 |
| JP | 2012-185752 A | 9/2012 | | |
| JP | 5251629 B2 * | 7/2013 | ............. | G06T 5/008 |
| JP | 2014-012011 A | 1/2014 | | |
| JP | 2017-021427 A | 1/2017 | | |
| JP | 2017045447 A | 3/2017 | | |
| JP | 2017187911 A | 10/2017 | | |
| WO | WO-2012050185 A1 * | 4/2012 | ............. | G06T 5/002 |
| WO | 2017/038012 A1 | 3/2017 | | |

OTHER PUBLICATIONS

Office Action for JP Patent Application No. 2019-562988, dated Jun. 21, 2022, 02 pages of English Translation and 03 pages of Office Action.

* cited by examiner

FIG. 5

| PLACE | PLACE-RELATED NON-FEATURE PORTION |
|---|---|
| ABC BUILDING, EIGHTH FLOOR | CEILING |
| ELEVATOR HALL | SOUTH-FACING WALL, FLOOR |

| PLACE | | PLACE-RELATED NON-FEATURE PORTION |
|---|---|---|
| LATITUDE <X, LONGITUDE <Y | | PLANE DIRECTION (PARALLEL TO GRAVITY, PERPENDICULAR TO GRAVITY) |
| INTENSITY OF RADIO WAVES FROM WIRELESS ACCESS POINT XXX IS WITHIN Y | | SOUTH-FACING WALL |

CONTROL DEVICE, CONTROL METHOD, AND MOBILE OBJECT TO ESTIMATE THE MOBILE OBJECT'S SELF-POSITION

CROSS REFERENCE TO RELATED APPLICATIONS

This application is a U.S. National Phase of International Patent Application No. PCT/JP2018/046018 filed on Dec. 14, 2018, which claims priority benefit of Japanese Patent Application No. JP 2017-253150 filed in the Japan Patent Office on Dec. 28, 2017. Each of the above-referenced applications is hereby incorporated herein by reference in its entirety.

TECHNICAL FIELD

The present disclosure relates to a control device and a control method, a program, and a mobile object, and more particularly, to a control device and a control method, a program, and a mobile object that can estimate a self-position with high accuracy.

BACKGROUND ART

There is a technology for capturing an image of surroundings and estimating a self-position or a posture from a feature amount in the captured image.

For example, there has been proposed a technology for assisting traveling by recognizing a self-position by comparing a characteristic object such as an information sign ahead in a field of vision against a stored image to detect the characteristic object ahead (see Patent Document 1).

Furthermore, a technology has been proposed for estimating position/posture data of a robot or a target object by comparing a captured image against a template image for each line of sight direction (see Patent Document 2).

Moreover, a technology has been proposed in which feature points are selected by pattern recognition using feature points in an image and landmark information, and landmark candidates of the same number as the feature points are created to estimate a position (see Patent Document 3).

CITATION LIST

Patent Document

Patent Document 1: Japanese Patent Application Laid-Open No. 2014-012011
Patent Document 2: Japanese Patent Application Laid-Open No. 2012-185752
Patent Document 3: Japanese Patent Application Laid-Open No. 2010-033447

SUMMARY OF THE INVENTION

Problems to be Solved by the Invention

However, in any of Patent Documents 1 to 3, in an environment where there are a large number of similar objects at different positions in the surroundings and many of detected feature amounts are similar, many matching feature amounts are detected, and the different positions are sometimes erroneously detected as being the same position.

The present disclosure has been made in view of such a situation, and in particular, enables distinction among positions and accurate estimation of a self-position even in an environment where different positions include many similar feature amounts in surroundings and are thus likely to be erroneously detected as being the same position.

Solutions to Problems

A control device according to a first aspect of the present disclosure includes a self-position estimation unit that estimates a self-position, an imaging unit that captures an image of surroundings, a first mask generation unit that generates a mask for the image of the surroundings on the basis of a place-related non-feature portion representing an area, in the image of the surroundings, that is not useful for identifying the self-position, a first feature amount extraction unit that extracts an image feature amount from the image of the surroundings to which the mask has been added by the first mask generation unit, and a registration unit that registers, as a database, the image feature amount in association with positional information regarding a self-position estimated by the self-position estimation unit.

The first mask generation unit may generate a mask for a non-feature region that is an area, in the image of the surroundings, that is not useful for identifying the self-position, in accordance with a place corresponding to the self-position, on the basis of a place-related non-feature portion representing an area, in the image of the surroundings, that is not useful for identifying the self-position.

A place-related non-feature portion database in which the place-related non-feature portion is registered in association with the place may be further included. The first mask generation unit may generate a mask for a non-feature region that is an area, in the image of the surroundings, that is not useful for identifying the self-position, on the basis of the place-related non-feature portion registered in the place-related non-feature portion database in association with a place corresponding to the self-position.

The first feature amount extraction unit may extract an image feature amount from the image of the surroundings captured by the imaging unit. A current information-based self-position estimation unit that estimates, as a current information-based self-position, the positional information registered in the database in association with the image feature amount may be further included.

An integration unit that integrates and outputs, as a self-position estimation result, a current information-based self-position estimated by the current information-based self-position estimation unit and a self-position estimated by the self-position estimation unit may be further included. The integration unit may register, in the database, the self-position estimation result and an image feature amount extracted by the first feature amount extraction unit in association with each other.

A place-related non-feature portion database in which the place-related non-feature portion is registered in association with a place corresponding to the self-position and a place-related non-feature portion generation/registration unit that generates an area as a new piece of the place-related non-feature portion in association with the same place, the area including statistically similar image feature amounts from among a plurality of the image feature amounts at the same place identified on the basis of a position registered in the database, and registers the place-related non-feature portion in the place-related non-feature portion database may be further included.

A second mask generation unit that generates, on the basis of a place-related non-feature portion representing an area, in the image of the surroundings, that is not useful for identifying a self-position, a mask for a feature region that is an area, in the image of the surroundings, that is not useful for identifying the self-position, a second feature amount extraction unit that extracts, as a non-feature region feature amount, an image feature amount from the image of the surroundings to which the mask has been added by the second mask generation unit, a position/non-feature region feature amount database registration unit that registers, in a position/non-feature region feature amount database, the non-feature region feature amount in association with positional information regarding a self-position estimated by the self-position estimation unit, a non-feature region feature amount extraction unit that extracts a non-feature region feature amount for the image of the surroundings on the basis of a place-related non-feature portion of a place corresponding to the current information-based self-position, and a check unit that checks the current information-based self-position on the basis of a similarity between the non-feature region feature amount extracted by the non-feature region feature amount extraction unit and the non-feature region feature amount registered in the position/non-feature region feature amount database in association with the current information-based self-position may be further included.

A self-position indeterminate state determination unit that determines whether or not a self-position is indeterminate on the basis of a time-series change amount of a self-position estimation result output from the integration unit, or on the basis of whether or not power has turned on may be further included. In a case where the self-position is indeterminate, the integration unit may output the current information-based self-position as a self-position estimation result. The check unit may check the current information-based self-position on the basis of a similarity between the non-feature region feature amount extracted by the non-feature region feature amount extraction unit and the non-feature region feature amount registered in the position/non-feature region feature amount database in association with the current information-based self-position. In a case where the similarity is lower than a predetermined threshold, it may be determined that the self-position is indeterminate, and the integration unit may output the current information-based self-position as a self-position estimation result. In a case where the similarity is higher than the predetermined threshold, it may be determined that the self-position is no longer indeterminate, and the integration unit may integrate the current information-based self-position estimated by the current information-based self-position estimation unit and a self-position estimated by the self-position estimation unit, and output an integration result as a self-position estimation result.

The place-related non-feature portion may be constituted by a table containing a place corresponding to the self-position and a place-related non-feature portion.

The place-related non-feature portion may be constituted by a table containing a place corresponding to the self-position and a place attribute, which is an abstraction of the place, and a table containing the place attribute and the place-related non-feature portion.

The imaging unit may be a stereo camera. The image of the surroundings captured by the stereo camera may be a stereo image. A depth image generation unit configured to generate a depth image on the basis of the stereo image may be further included. The first mask generation unit may generate a mask for the image of the surroundings including the depth image on the basis of a place-related non-feature portion representing an area, in the image of the surroundings, that is not useful for identifying the self-position in accordance with a place corresponding to the self-position. The first feature amount extraction unit may extract an image feature amount from the image of the surroundings including the depth image with the mask added.

The self-position estimation unit may include a time-series information-based self-position estimation unit that estimates the self-position by using time-series information including sensor information supplied in a time-series order and outputs an estimation result as a time-series information-based self-position.

The time-series information may be three-dimensional point cloud data detected by a light detection and ranging or laser imaging detection and ranging (LIDAR), and positional information, a posture, a velocity, an acceleration, and an angular velocity detected by a wheel encoder.

A first control method according to the present disclosure includes self-position estimation processing of estimating a self-position, imaging processing of capturing an image of surroundings, first mask generation processing of generating a mask for the image of the surroundings on the basis of a place-related non-feature portion representing an area, in the image of the surroundings, that is not useful for identifying the self-position, first feature amount extraction processing of extracting an image feature amount from the image of the surroundings to which the mask has been added by the first mask generation processing, and registration processing of registering, as a database, the image feature amount in association with positional information regarding the self-position estimated by the self-position estimation processing.

A program according to the first aspect of the present disclosure causes a computer to function as a self-position estimation unit that estimates a self-position, an imaging unit that captures an image of surroundings, a first mask generation unit that generates a mask for the image of the surroundings on the basis of a place-related non-feature portion representing an area, in the image of the surroundings, that is not useful for identifying the self-position, a first feature amount extraction unit that extracts an image feature amount from the image of the surroundings to which the mask has been added by the first mask generation unit, and a registration unit that registers, as a database, the image feature amount in association with positional information regarding a self-position estimated by the self-position estimation unit.

A mobile object according to the first aspect of the present disclosure includes a self-position estimation unit that estimates a self-position, an imaging unit that captures an image of surroundings, a first mask generation unit that generates a mask for the image of the surroundings on the basis of a place-related non-feature portion representing an area, in the image of the surroundings, that is not useful for identifying the self-position, a first feature amount extraction unit that extracts an image feature amount from the image of the surroundings to which the mask has been added by the first mask generation unit, and a registration unit that registers, as a database, the image feature amount in association with positional information regarding a self-position estimated by the self-position estimation unit.

In the first aspect of the present disclosure, a self-position is estimated, an image of surroundings is captured, a mask is generated for the image of the surroundings in accordance with a place corresponding to the self-position on the basis of a place-related non-feature portion representing an area, in the image of the surroundings, that is not useful for identifying the self-position, an image feature amount is extracted from the image of the surroundings with the mask added, and the image feature amount and positional information of the estimated self-position are associated with each other and registered as a database.

A control device according to a second aspect of the present disclosure further includes a self-position estimation unit that estimates a self-position, an imaging unit that captures an image of surroundings, a mask generation unit that generates a mask for the image of the surroundings on the basis of a place-related non-feature portion representing an area, in the image of the surroundings, that is not useful for identifying the self-position, a feature amount extraction unit that extracts an image feature amount from the image of the surroundings to which the mask has been added by the mask generation unit, a registration unit that registers, as a database, the image feature amount in association with positional information regarding a self-position estimated by the self-position estimation unit, and a current information-based self-position estimation unit that estimates a current information-based self-position on the basis of the database. In a case of estimating the current information-based self-position, the feature amount extraction unit extracts the image feature amount from the image of the surroundings captured by the imaging unit, and the current information-based self-position estimation unit estimates, as a current information-based self-position, the positional information registered in the database in association with the image feature amount extracted by the feature amount extraction unit.

A control method according to the second aspect of the present disclosure further includes self-position estimation processing of estimating a self-position, imaging processing of capturing an image of surroundings, mask generation processing of generating a mask for the image of the surroundings on the basis of a place-related non-feature portion representing an area, in the image of the surroundings, that is not useful for identifying the self-position, feature amount extraction processing of extracting an image feature amount from the image of the surroundings to which the mask has been added by the mask generation processing, registration processing of registering, as a database, the image feature amount in association with positional information regarding a self-position estimated by the self-position estimation processing, and current information-based self-position estimation processing of estimating a current information-based self-position on the basis of the database. In a case of estimating the current information-based self-position, the feature amount extraction processing extracts the image feature amount from the image of the surroundings captured by the imaging processing, and the current information-based self-position estimation processing estimates, as a current information-based self-position, the positional information registered in the database in association with the image feature amount extracted by the feature amount extraction processing.

A program according to the second aspect of the present disclosure causes a computer to function as a self-position estimation unit that estimates a self-position, an imaging unit that captures an image of surroundings, a mask generation unit that generates a mask for the image of the surroundings on the basis of a place-related non-feature portion representing an area, in the image of the surroundings, that is not useful for identifying the self-position, a feature amount extraction unit that extracts an image feature amount from the image of the surroundings to which the mask has been added by the mask generation unit, a registration unit that registers, in a database, the image feature amount in association with positional information regarding a self-position estimated by the self-position estimation unit, and a current information-based self-position estimation unit that estimates a current information-based self-position on the basis of the database. In a case of estimating the current information-based self-position, the feature amount extraction unit extracts the image feature amount from the image of the surroundings captured by the imaging unit, and the current information-based self-position estimation unit estimates, as a current information-based self-position, the positional information registered in the database in association with the image feature amount extracted by the feature amount extraction unit.

A mobile object according to the second aspect of the present disclosure further includes a self-position estimation unit that estimates a self-position, an imaging unit that captures an image of surroundings, a mask generation unit that generates a mask for the image of the surroundings on the basis of a place-related non-feature portion representing an area, in the image of the surroundings, that is not useful for identifying the self-position, a feature amount extraction unit that extracts an image feature amount from the image of the surroundings to which the mask has been added by the mask generation unit, a registration unit that registers, as a database, the image feature amount in association with positional information regarding a self-position estimated by the self-position estimation unit, and a current information-based self-position estimation unit that estimates a current information-based self-position on the basis of the database. In a case of estimating the current information-based self-position, the feature amount extraction unit extracts the image feature amount from the image of the surroundings captured by the imaging unit, and the current information-based self-position estimation unit estimates, as a current information-based self-position, the positional information registered in the database in association with the image feature amount extracted by the feature amount extraction unit.

In the second aspect of the present disclosure, a self-position is estimated, an image of surroundings is captured, a mask is generated for the image of the surroundings on the basis of a place-related non-feature portion representing an area, in the image of the surroundings, that is not useful for identifying the self-position, an image feature amount is extracted from the image of the surroundings with the mask added, the image feature amount and positional information of the estimated self-position are associated with each other and registered as a database, and a current information-based self-position is estimated on the basis of the database. In a case of estimating the current information-based self-position, the image feature amount is extracted from the captured image of the surroundings of the self-position, and the positional information registered in the database in association with the extracted image feature amount is estimated as a current information-based self-position.

Effects of the Invention

According to an aspect of the present disclosure, in particular, it is possible to distinguish among positions and estimate a self-position with high accuracy even in an environment where different positions include many similar feature amounts in surroundings and are thus likely to be erroneously detected as being the same position.

BRIEF DESCRIPTION OF DRAWINGS

FIG. 5 is a diagram illustrating a place-related non-feature portion.

MODE FOR CARRYING OUT THE INVENTION

Figure 1:
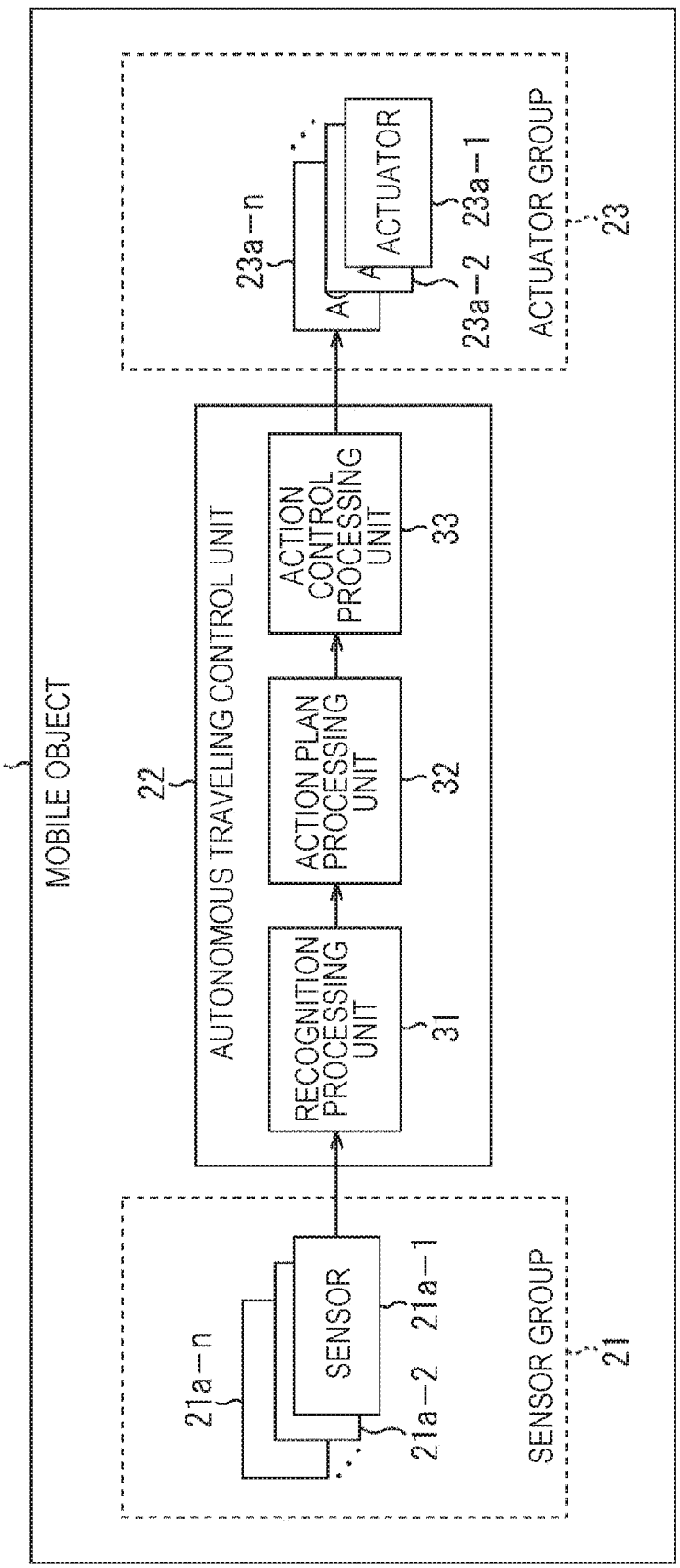
FIG. 1 is a diagram illustrating a configuration example of a mobile object for describing an outline of the present disclosure.

Preferred embodiments of the present disclosure will be described below in detail with reference to the accompanying drawings. Note that, in the present specification and drawings, components having substantially the same functional configurations are denoted by the same reference numerals, and the description thereof will thus not be repeated.

Embodiments for carrying out the present technology will be described below. Note that the description will be given in the order below.

1. Outline of present disclosure
2. First Embodiment
3. Second Embodiment
4. Third Embodiment
5. Example of execution by software

1. Outline of Present Disclosure

A mobile object according to the present disclosure is capable of distinguishing among positions and estimating its self-position with high accuracy even in an environment where different positions include many similar feature amounts and the different positions are likely to be erroneously detected as being the same position.

FIG. 1 illustrates a configuration example that outlines a mobile object 11 according to the present disclosure.

The mobile object 11 is, for example, a robot or the like, and includes a sensor group 21, an autonomous traveling control unit 22, and an actuator group 23.

The sensor group 21 includes sensors 21a-1 to 21a-n that detect various types of information necessary for recognizing a situation inside the mobile object 11 and a situation around the mobile object 11, and outputs detection results to the autonomous traveling control unit 22. Furthermore, in a case where it is not necessary to particularly distinguish among the sensors 21a-1 to 21a-n, the sensors 21a-1 to 21a-n are simply referred to as the sensors 21a, and other configurations are referred to in a similar way.

More specifically, the sensors 21a-1 to 21a-n include, for example, a camera that captures an image around the mobile object 11, an acceleration sensor that detects movement of the mobile object 11, a LIDAR that measures a distance to an object that exists around the mobile object 11, a time of flight (ToF) sensor, a geomagnetic sensor that detects a direction, a gyro sensor, an acceleration sensor, a barometric pressure sensor that detects a change in ambient air pressure, a contact sensor that detects, for example, whether or not contact has been made, a temperature sensor that detects a temperature, a humidity sensor that detects humidity, a position sensitive detector (PSD) ranging sensor, a global navigation satellite system (GNSS) that detects a position on the earth, and the like.

The autonomous traveling control unit 22 recognizes a situation in surroundings from various detection results of the sensor group 21, generates an action plan on the basis of a recognition result, and operates various actuators 23a-1 to 23a-n of the actuator group 23 that drives the robot in accordance with the action plan. Furthermore, in a case where it is not necessary to particularly distinguish among the actuators 23a-1 to 23a-n, the actuators 23a-1 to 23a-n are simply referred to as the actuators 23a, and other configurations are referred to in a similar way.

To be more specific, the autonomous traveling control unit 22 includes a recognition processing unit 31, an action plan processing unit 32, and an action control processing unit 33.

The recognition processing unit 31 executes recognition processing on the basis of detection results supplied from the sensor group 21, recognizes, for example, an image, a person, an object, a type of facial expression, a position, an attribute, or a position of itself or an obstacle, and outputs it to the action plan processing unit 32 as a recognition result. Furthermore, the recognition processing unit 31 estimates a self-position on the basis of the detection results supplied from the sensor group 21.

The action plan processing unit 32 generates, on the basis of the recognition result, an action plan including the overall action of the mobile object 11 such as a trajectory of traveling of a device related to traveling of the mobile object 11, a change in state, and a speed or an acceleration, and supplies the action plan to the action control processing unit 33.

On the basis of the action plan supplied from the action plan processing unit 32, the action control processing unit 33 generates a control signal for controlling a specific movement of each of the actuators 23a-1 to 23a-n of the actuator group 23 to operate the actuator group 23.

The actuator group 23 operates the actuators 23a-1 to 23a-n that specifically operate the mobile object 11 on the basis of the control signal supplied from the action control processing unit 33. To be more specific, the actuators 23a-1 to 23a-n cause a motor, a servomotor, a brake, and the like that implement a specific movement of the mobile object 11 to operate on the basis of the control signal.

Furthermore, the actuators 23a-1 to 23a-n include a configuration for implementing an expansion and contraction motion, a bending and stretching motion, a turning motion, or the like, and also include configurations such as a display unit including, for example, a light emission diode (LED) or a liquid crystal display (LCD) that displays information, and a speaker that outputs sound. Consequently, by controlling the actuator group 23 on the basis of the control signal, operations of various devices that drive the mobile object 11 are implemented, information is displayed, and sound is output.

That is, by controlling the actuators 23a-1 to 23a-n of the actuator group 23, operations related to traveling of the mobile object 11 are controlled, and provision of various types of information such as display of information and output of sound is also controlled.

<Outline of Self-Position Estimation According to Present Disclosure>

The recognition processing unit 31 estimates a self-position on the basis of detection results supplied from the sensor group 21.

More specifically, the recognition processing unit 31 extracts a feature amount from an image of surroundings of the self-position captured by the sensor group 21 such as a camera, compares the feature amount against a feature amount in an image registered in advance in a database (DB) in association with a position, and reads out information regarding a position registered in association with a matching feature amount to estimate the self-position.

Figure 2:
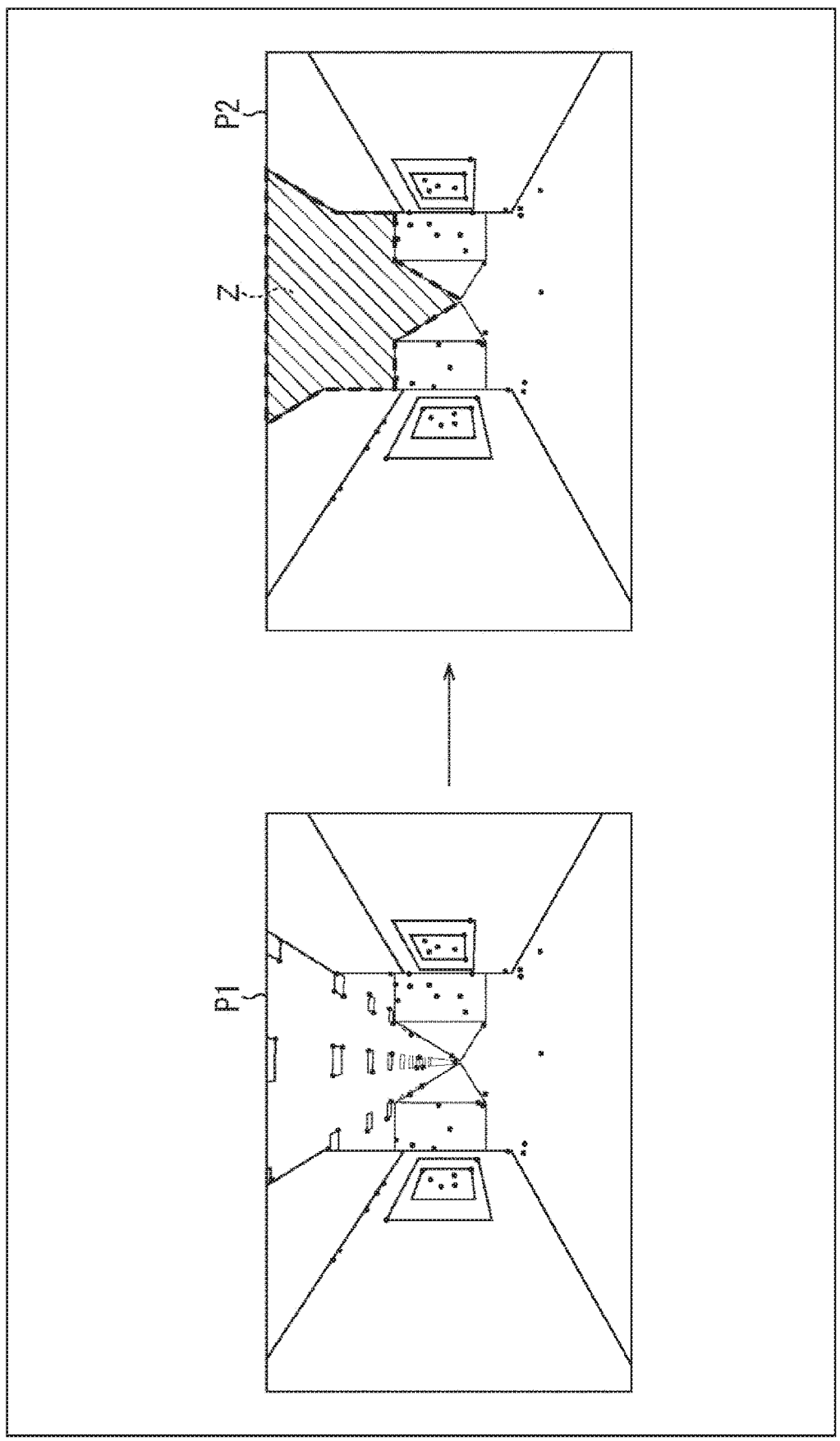
FIG. 2 is a diagram illustrating the outline of the present disclosure.

However, for example, in a case of a corridor in an office building as illustrated in the left part of FIG. 2, corridors on different floors often have substantially similar surrounding environments, and extracted feature amounts are also similar in many cases. Thus, corridors on different floors may be erroneously detected as being the corridor on the same floor when a self-position is detected.

In particular, lighting fixtures installed on the ceiling of the corridor are detected as many feature amounts, which causes induction of erroneous detection.

For this reason, in the present disclosure, as illustrated in the right part of FIG. 2, feature amounts are extracted from an image with a masking region Z added to a ceiling portion including many feature amounts that are likely to induce erroneous detection, in other words, that are not useful (valid) for distinction from other floors, and the extracted feature amounts are associated with positional information and registered in the DB in advance.

That is, in the present disclosure, feature amounts are extracted from an image of surroundings with a mask applied to a region that is likely to result in extraction of the same feature amounts and does not have a significant difference from other positions, and the extracted feature amounts are associated with positional information to constitute a DB in advance. This enables distinction among positions and accurate estimation of the self-position even in an environment where different positions include many similar objects.

2. First Embodiment

<Configuration Example of Mobile Object Control System that Controls Mobile Object According to Present Disclosure>

A mobile object control system that controls the mobile object 11 for implementing the above-described function will be described.

Figure 3:
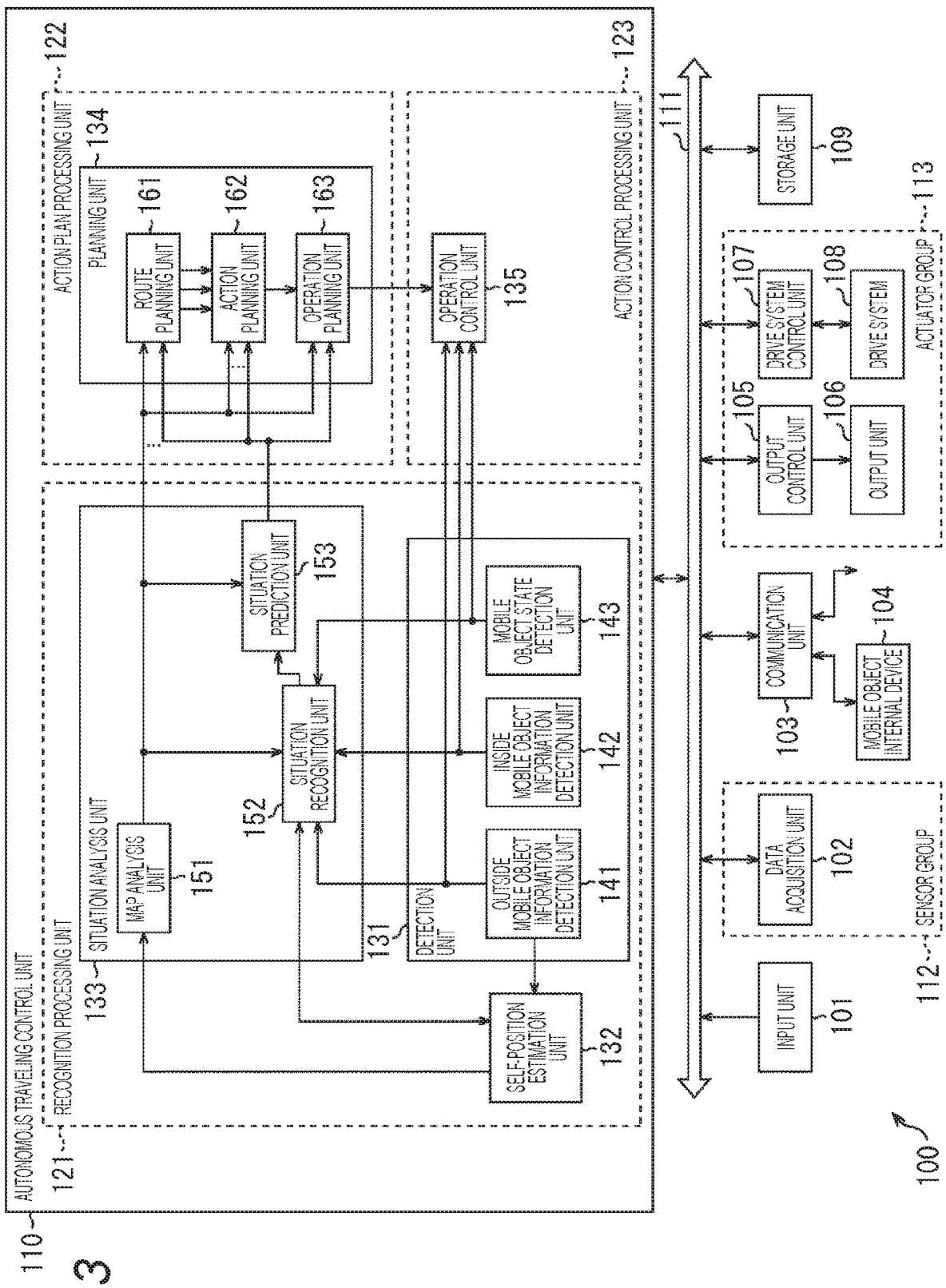
FIG. 3 is a block diagram illustrating a configuration example of a mobile object control system that controls a mobile object according to the present disclosure.

FIG. 3 is a block diagram illustrating a configuration example of a schematic function of a mobile object control system 100 that controls the mobile object 11 according to the present disclosure. Note that, while the mobile object control system 100 in FIG. 3 is an example of a mobile object control system that controls the mobile object 11 including a robot to which the present technology can be applied. However, the mobile object control system 100 can also be applied as a system that controls other mobile objects such as an aircraft, a ship, and a multi-rotor copter (drone), for example. Furthermore, the robot may be a wheeled robot, a self-driving car that can be manned, or a multi-legged walking robot.

The mobile object control system 100 includes an input unit 101, a data acquisition unit 102, a communication unit 103, a mobile object internal device 104, an output control unit 105, an output unit 106, a drive system control unit 107, a drive system 108, a storage unit 109, and an autonomous traveling control unit 110. The input unit 101, the data acquisition unit 102, the communication unit 103, the output control unit 105, the drive system control unit 107, the storage unit 109, and the autonomous traveling control unit 110 are connected with each other via a communication network 111. The communication network 111 includes, for example, a local area network (LAN) such as a controller area network (CAN), a local interconnect network (LIN), or IEEE802.3, a communication network or a bus compliant with FlexRay (registered trademark) or any other standard, or a unique communication method that has not been standardized. Note that the components of the mobile object control system 100 may be directly connected with each other instead of being connected via the communication network 111.

Note that, hereinafter, in a case where the components of the mobile object control system 100 communicate via the communication network 111, the description of the communication network 111 will be omitted. For example, in a case where the input unit 101 and the autonomous traveling control unit 110 communicate via the communication network 111, it will simply be described that the input unit 101 and the autonomous traveling control unit 110 communicate with each other.

The input unit 101 includes a device used by an occupant for inputting various types of data, an instruction, and the like. For example, the input unit 101 includes an operation device such as a touch panel, a button, a microphone, a switch, and a lever, and an operation device that enables input by a method other than manual operation, such as voice or a gesture. Furthermore, for example, the input unit 101 may be a remote control device using infrared rays or other radio waves, or an externally connected device such as a mobile device or a wearable device that supports operation of the mobile object control system 100. The input unit 101 generates an input signal on the basis of data, an instruction, or the like input by an occupant, and supplies the input signal to the components of the mobile object control system 100.

The data acquisition unit 102 includes, for example, various sensors for acquiring data used for processing performed by the mobile object control system 100, and supplies the obtained data to the components of the mobile object control system 100.

For example, the data acquisition unit 102 includes various sensors for detecting a state and the like of a mobile object to constitute the sensor group 112, which corresponds to the sensor group 21 constituted by the sensors 21a-1 to 21a-n in FIG. 1. Specifically, the data acquisition unit 102 includes, for example, a gyro sensor, an acceleration sensor, an inertial measurement unit (IMU), and a sensor for detecting an amount of operation for inputting an acceleration of an accelerator or the like, an amount of operation for inputting a deceleration, an amount of operation for inputting a direction instruction, the number of revolutions or an amount of input/output energy or fuel of a drive device such as an engine or a motor, an amount of torque of an engine, a motor, or the like, a rotation speed or a torque of a wheel or a joint, or the like.

Furthermore, for example, the data acquisition unit 102 includes various sensors for detecting information outside the mobile object. Specifically, for example, the data acquisition unit 102 includes an imaging device such as a time of flight (ToF) camera, a stereo camera, a monocular camera, an infrared camera, a polarization camera, and other cameras. Furthermore, for example, the data acquisition unit 102 includes an environment sensor for detecting the weather, climate, or the like, and a surrounding information detection sensor for detecting an object around the mobile object. The environmental sensor includes, for example, a raindrop sensor, a fog sensor, a sunshine sensor, a snow sensor, and the like. The surrounding information detection sensor includes, for example, a laser ranging sensor, an ultrasonic sensor, a radar, a light detection and ranging or laser imaging detection and ranging (LIDAR), a sonar, and the like.

Moreover, for example, the data acquisition unit 102 includes various sensors for detecting a current position of the mobile object. Specifically, for example, the data acquisition unit 102 includes, for example, a global navigation satellite system (GNSS) receiver that receives a GNSS signal from a GNSS satellite.

The communication unit 103 communicates with the mobile object internal device 104, and various devices, servers, base stations, and the like outside the mobile object, transmits data supplied from the components of the mobile object control system 100, and supplies received data to the components of the mobile object control system 100. Note that the communication protocol supported by the communication unit 103 is not particularly limited, and the communication unit 103 can support a plurality of types of communication protocols.

For example, the communication unit 103 performs wireless communication with the mobile object internal device 104 by wireless LAN, Bluetooth (registered trademark), near field communication (NFC), wireless USB (WUSB), or the like. Furthermore, for example, the communication unit 103 performs wired communication with the mobile object internal device 104 via a connection terminal (not illustrated) (and a cable if necessary) by universal serial bus (USB), high-definition multimedia interface (HDMI) (registered trademark), mobile high-definition link (MHL), or the like.

Moreover, for example, the communication unit 103 communicates with a device (for example, an application server or a control server) on an external network (for example, the Internet, a cloud network, or an operator-specific network) via a base station or an access point. Furthermore, for example, the communication unit 103 uses a peer-to-peer (P2P) technology to communicate with a terminal (for example, a terminal of a pedestrian or a shop, or a machine type communication (MTC) terminal) near the mobile object. Moreover, for example, in a case where the mobile object 11 is a vehicle, the communication unit 103 performs V2X communication such as vehicle-to-vehicle communication, vehicle-to-infrastructure communication, vehicle-to-home communication, and vehicle-to-pedestrian communication. Furthermore, for example, the communication unit 103 includes a beacon reception unit to receive radio waves or electromagnetic waves transmitted from a wireless station or the like installed on a road, and acquire information such as a current position, traffic jams, traffic restrictions, or time required.

The mobile object internal device 104 includes, for example, a mobile device or wearable device possessed by an occupant, an information device carried in or attached to the mobile object, a navigation device for searching for a route to an optional destination, and the like.

The output control unit 105 controls output of various types of information to an occupant in the mobile object or to the outside of the mobile object. For example, the output control unit 105 generates an output signal including at least one of visual information (for example, image data) or auditory information (for example, audio data), and supplies the output signal to the output unit 106, thereby controlling output of visual information and auditory information from the output unit 106. Specifically, for example, the output control unit 105 generates an overhead image, a panoramic image, or the like by combining pieces of image data captured by different imaging devices of the data acquisition unit 102, and supplies the output unit 106 with an output signal including the generated image. Furthermore, for example, the output control unit 105 generates audio data including a warning sound or a warning message and the like for danger such as a collision, contact, or entering a dangerous zone, and supplies the output unit 106 with an output signal including the generated audio data.

The output unit 106 includes a device capable of outputting visual information or auditory information to an occupant in the mobile object or to the outside of the mobile object. For example, the output unit 106 includes a display device, an instrument panel, an audio speaker, a headphone, a wearable device such as a glasses-type display worn by an occupant, a projector, a lamp, and the like. The display device included in the output unit 106 may be a device having a normal display, or may be, for example, a head-up display, a transmissive display, or a device that displays visual information in a driver's field of vision such as a device having an augmented reality (AR) display function. Note that the output control unit 105 and the output unit 106 are not configurations indispensable for processing of autonomous traveling, and may be omitted as necessary.

The drive system control unit 107 controls the drive system 108 by generating various control signals and supplying them to the drive system 108. Furthermore, the drive system control unit 107 supplies a control signal to the components other than the drive system 108 as necessary to give a notification of a control state of the drive system 108, and the like.

The drive system 108 includes various devices related to a driving system of the mobile object. For example, the drive system 108 includes a servomotor capable of designating an angle and a torque designed for each joint of four legs, a motion controller that breaks down and converts a movement of traveling of the robot itself into movements of the four legs, and a feedback control device constituted by sensors in motors or sensors on soles.

In another example, the drive system 108 includes four to six motors having propellers installed upward from an airframe, and a motion controller that breaks down and converts a movement of traveling of the robot itself into amounts of rotation of motors.

Moreover, in another example, the drive system 108 includes a driving force generating device for generating driving force such as an internal combustion engine or a drive motor, a driving force transmission mechanism for transmitting driving force to wheels, a steering mechanism that adjusts a steering angle, a braking device that generates braking force, an antilock brake system (ABS), an electronic stability control (ESC), an electric power steering device, and the like. Note that the output control unit 105, the output unit 106, the drive system control unit 107, and the drive system 108 constitute an actuator group 113, which corresponds to the actuator group 23 including the actuators 23*a*-1 to 23*a*-*n* in FIG. 1.

The storage unit 109 includes, for example, a magnetic storage device such as a read only memory (ROM), a random access memory (RAM), and a hard disc drive (HDD), a semiconductor storage device, an optical storage device, a magneto-optical storage device, and the like. The storage unit 109 stores various programs, data, and the like used by the components of the mobile object control system 100. For example, the storage unit 109 stores map data such as a three-dimensional high definition map such as a dynamic map, a global map that is less accurate than a high definition map and covers a wide area, and a local map that includes information around a mobile object.

The autonomous traveling control unit 110 performs control related to autonomous traveling such as automated driving or driving assistance. Specifically, for example, the autonomous traveling control unit 110 performs cooperative control for the purpose of implementing functions of collision avoidance or impact mitigation of the mobile object, follow-up traveling based on a distance between mobile objects, traveling while maintaining a speed of the mobile object, or warning of collision of the mobile object. Furthermore, for example, the autonomous traveling control unit 110 performs cooperative control for the purpose of autonomous traveling for traveling autonomously without depending on operation of an operator/user, or the like. The autonomous traveling control unit 110 includes a detection unit 131, a self-position estimation unit 132, a situation analysis unit 133, a planning unit 134, and an operation control unit 135. Among them, the detection unit 131, the self-position estimation unit 132, and the situation analysis unit 133 constitute a recognition processing unit 121, which corresponds to the recognition processing unit 31 in FIG. 1. Furthermore, the planning unit 134 constitutes an action plan processing unit 122, which corresponds to the action plan processing unit 32 in FIG. 1. Moreover, the operation control unit 135 constitutes an action control processing unit 123, which corresponds to the action control processing unit 33 in FIG. 1.

The detection unit 131 detects various types of information necessary for controlling autonomous traveling. The detection unit 131 includes an outside mobile object information detection unit 141, an inside mobile object information detection unit 142, and a mobile object state detection unit 143.

The outside mobile object information detection unit 141 performs processing of detecting information outside the mobile object on the basis of data or a signal from the components of the mobile object control system 100. For example, the outside mobile object information detection unit 141 performs detection processing, recognition processing, and tracking processing for an object around the mobile object, and processing of detecting a distance to the object. Objects to be detected include, for example, a mobile object, a person, an obstacle, a structure, a road, a traffic light, a traffic sign, a road marking, and the like. Furthermore, for example, the outside mobile object information detection unit 141 performs processing of detecting an environment surrounding the mobile object. The surrounding environment to be detected includes, for example, the weather, a temperature, humidity, brightness, a state of a road surface, and the like. The outside mobile object information detection unit 141 supplies data indicating results of the detection processing to the self-position estimation unit 132, a map analysis unit 151 and a situation recognition unit 152 of the situation analysis unit 133, the operation control unit 135, and the like.

The inside mobile object information detection unit 142 performs processing of detecting information inside the mobile object on the basis of data or a signal from the components of the mobile object control system 100. For example, the inside mobile object information detection unit 142 performs driver authentication and recognition processing, driver state detection processing, occupant detection processing, inside mobile object environment detection processing, and the like. The driver state to be detected includes, for example, a physical condition, an arousal level, a concentration level, a fatigue level, a line of sight direction, and the like. The inside mobile object environment to be detected includes, for example, a temperature, humidity, brightness, odor, and the like. The inside mobile object information detection unit 142 supplies data indicating results of the detection processing to the situation recognition unit 152 of the situation analysis unit 133, the operation control unit 135, and the like.

The mobile object state detection unit 143 performs processing of detecting a state of the mobile object on the basis of data or a signal from the components of the mobile object control system 100. The state of the mobile object to be detected includes, for example, a speed, an acceleration, a steering angle, whether or not an abnormality has occurred and details thereof, a state of a driving operation, a position and inclination of a power seat, a state of door lock, states of other devices mounted on the mobile object, and the like. The mobile object state detection unit 143 supplies data indicating results of the detection processing to the situation recognition unit 152 of the situation analysis unit 133, the operation control unit 135, and the like.

The self-position estimation unit 132 performs processing of estimating the position and posture of the mobile object and the like on the basis of data or a signal from the components of the mobile object control system 100 such as the outside mobile object information detection unit 141 and the situation recognition unit 152 of the situation analysis unit 133. Furthermore, the self-position estimation unit 132 generates a local map (hereinafter referred to as the map for self-position estimation) used for estimating a self-position as necessary. The map for self-position estimation is, for example, a high definition map using a technology such as simultaneous localization and mapping (SLAM). The self-position estimation unit 132 supplies data indicating results of the estimation processing to the map analysis unit 151 and the situation recognition unit 152 of the situation analysis unit 133, and the like. Furthermore, the self-position estimation unit 132 causes the storage unit 109 to store the map for self-position estimation.

Moreover, the self-position estimation unit 132 accumulates time-series information supplied in a time-series order in a database on the basis of detection results supplied from the sensor group 112, and on the basis of the accumulated time-series information, a self-position is estimated and output as a time-series information-based self-position. Furthermore, on the basis of current detection results supplied from the sensor group 112, the self-position estimation unit 132 estimates and outputs the self-position as a current information-based self-position. Then, the self-position estimation unit 132 outputs a self-position estimation result by integrating or switching between the time-series information-based self-position and the current information-based self-position. Moreover, the self-position estimation unit 132 includes, for estimation of a current information-based self-position, a position/image feature amount DB 225 (FIG. 4) in which an image feature amount extracted from an image among results of detection by the sensor group 112 is associated with a position. The self-position estimation unit 132 estimates the current information-based self-position by comparing a detection result against the position/image feature amount DB 225. The self-position estimation unit 132 has information regarding an area to be masked, in an image captured by the sensor group 112, for each place where many image feature amounts that are not useful for identifying a position are detected. When registering an image feature amount and a position in association with each other in the position/image feature amount DB 225 (FIG. 4), the self-position estimation unit 132 extracts and registers the image feature amount with a mask added, in accordance with the place, to an image captured by the sensor group 112. With this arrangement, an image feature amount is extracted with a mask added to an area that includes many image feature amounts that are not useful for identifying a position. This enables accurate distinction among positions and estimation of a self-position even in an environment that includes many similar image feature amounts, that is, image feature amounts that are not useful for identifying the position. Note that a detailed configuration of the self-position estimation unit 132 will be described later with reference to FIG. 4.

The situation analysis unit 133 performs processing of analyzing a situation of the mobile object and its surroundings. The situation analysis unit 133 includes the map analysis unit 151, the situation recognition unit 152, and a situation prediction unit 153.

By using, as necessary, data or a signal from the components of the mobile object control system 100 such as the self-position estimation unit 132 and the outside mobile object information detection unit 141, the map analysis unit 151 performs processing of analyzing various maps stored in the storage unit 109 and constructs a map including information necessary for the processing of autonomous traveling. The map analysis unit 151 supplies the constructed map to the situation recognition unit 152 and the situation prediction unit 153, and also to a route planning unit 161, an action planning unit 162, and an operation planning unit 163 of the planning unit 134, and the like.

The situation recognition unit 152 performs processing of recognizing a situation related to the mobile object on the basis of data or a signal from the components of the mobile object control system 100 such as the self-position estimation unit 132, the outside mobile object information detection unit 141, the inside mobile object information detection unit 142, the mobile object state detection unit 143, and the map analysis unit 151. For example, the situation recognition unit 152 performs processing of recognizing a situation of the mobile object, a situation around the mobile object, a situation of a driver of the mobile object, and the like. Furthermore, the situation recognition unit 152 generates a local map (hereinafter referred to as the map for situation recognition) used for recognizing a situation around the mobile object as necessary. The map for situation recognition is, for example, an occupancy grid map, a lane map, or a point cloud map.

The situation of the mobile object to be recognized includes, for example, a position, a posture, and a movement (for example, a speed, an acceleration, a moving direction, and the like) of the mobile object, and whether or not an abnormality has occurred and details thereof. The situation around the mobile object to be recognized includes, for example, a type and position of a stationary object in surroundings, a type, position and movement (for example, a speed, an acceleration, a moving direction, and the like) of a moving object in surroundings, a configuration and a state of a road surface in surroundings, and the surrounding weather, temperature, humidity, brightness, and the like. The driver state to be recognized includes, for example, a physical condition, an arousal level, a concentration level, a fatigue level, a line of sight movement, driving operation, and the like.

The situation recognition unit 152 supplies data indicating results of the recognition processing (including the map for situation recognition as necessary) to the self-position estimation unit 132, the situation prediction unit 153, and the like. Furthermore, the situation recognition unit 152 causes the storage unit 109 to store the map for situation recognition.

The situation prediction unit 153 performs processing of predicting a situation related to the mobile object on the basis of data or a signal from the components of the mobile object control system 100 such as the map analysis unit 151 and the situation recognition unit 152. For example, the situation prediction unit 153 performs processing of predicting a situation of the mobile object, a situation around the mobile object, a situation of a driver, and the like.

The situation of the mobile object to be predicted includes, for example, a behavior of the mobile object, occurrence of an abnormality, an available traveling distance, and the like. The situation around the mobile object to be predicted includes, for example, a behavior of a moving object around the mobile object, a change in a state of a traffic light, a change in the environment such as the weather, and the like. The situation of the driver to be predicted includes, for example, a behavior, a physical condition of the driver, and the like.

The situation prediction unit 153 supplies data indicating results of the prediction processing, together with data from the situation recognition unit 152, to the route planning unit 161, the action planning unit 162, and the operation planning unit 163 of the planning unit 134, and the like.

The route planning unit 161 plans a route to a destination on the basis of data or a signal from the components of the mobile object control system 100 such as the map analysis unit 151 and the situation prediction unit 153. For example, the route planning unit 161 sets a route from a current position to a designated destination on the basis of a global map. Furthermore, for example, the route planning unit 161 changes the route as appropriate on the basis of situations regarding traffic jams, accidents, traffic restrictions, construction, and the like, a physical condition of a driver, and the like. The route planning unit 161 supplies data indicating the planned route to the action planning unit 162 and the like.

The action planning unit 162 plans an action of the mobile object for safe traveling of the route planned by the route planning unit 161 within the planned time on the basis of data or a signal from the components of the mobile object control system 100 such as the map analysis unit 151 and the situation prediction unit 153. For example, the action planning unit 162 makes a plan including a start, a stop, a traveling direction (for example, going forward, going backward, turning left, turning right, changing the direction, and the like), a traveling speed, overtaking, and the like. The action planning unit 162 supplies data indicating the planned action of the mobile object to the operation planning unit 163 and the like.

The operation planning unit 163 plans an operation of the mobile object for implementing the action planned by the action planning unit 162 on the basis of data or a signal from the components of the mobile object control system 100 such as the map analysis unit 151 and the situation prediction unit 153. For example, the operation planning unit 163 makes a plan including an acceleration, a deceleration, a traveling trajectory, and the like. The operation planning unit 163 supplies data indicating the planned operation of the mobile object to the operation control unit 135 and the like.

The operation control unit 135 controls the operation of the mobile object.

To be more specific, on the basis of results of detection by the outside mobile object information detection unit 141, the inside mobile object information detection unit 142, and the mobile object state detection unit 143, the operation control unit 135 performs processing of detecting an emergency event such as a collision, contact, entering a dangerous zone, an abnormality of a driver, or an abnormality of the mobile object. In a case where occurrence of an emergency event has been detected, the operation control unit 135 plans an operation of the mobile object for avoiding an emergency event, such as a sudden stop or a sharp turn.

Furthermore, the operation control unit 135 controls an acceleration and a deceleration for implementing the operation of the mobile object planned by the operation planning unit 163. For example, the operation control unit 135 computes a control target value of the driving force generating device or the braking device for achieving the planned acceleration, deceleration, or sudden stop, and supplies the drive system control unit 107 with a control command indicating the computed control target value.

The operation control unit 135 controls the direction for implementing the operation of the mobile object planned by the operation planning unit 163. For example, the operation control unit 135 computes a control target value of the steering mechanism for implementing the traveling trajectory or sharp turn planned by the operation planning unit 163, and supplies the drive system control unit 107 with a control command indicating the computed control target value.

<Detailed Configuration Example of Recognition Processing Unit>

Next, with reference to FIG. 4, a description will be given of a specific configuration example of the recognition processing unit 121 of the autonomous traveling control unit 110 corresponding to the recognition processing unit 31 and its surroundings in the mobile object control system 100 in FIG. 3.

Note that, while an example in which the mobile object is the mobile object 11 including a wheeled mobile robot will be described here, the mobile object may be a robot, a vehicle, or any other mobile object.

The sensor group 112 includes a LIDAR 201, a wheel encoder 202, and a stereo camera 203. As a matter of course, other sensors may be used in a case of a quadrupedal walking robot, a vehicle, or the like.

The LIDAR 201 acquires a distance to an object around the mobile object 11 as three-dimensional point cloud data, which is then output as time-series information to a time-series information-based self-position estimation unit 221 of the self-position estimation unit 132 via the detection unit 131.

The wheel encoder 202 detects positional information (X, Y, Z), a posture (quaternion), a velocity (dx, dy, dz), an acceleration (ax, ay, az), and an angular velocity (wx, wy, wz) of the mobile object 11, and outputs them as time-series information to the time-series information-based self-position estimation unit 221 via the detection unit 131.

The stereo camera 203 captures a parallax image around the mobile object 11, and outputs the parallax image as current information to the self-position estimation unit 132 via the detection unit 131.

The self-position estimation unit 132 includes a depth image generation unit 220, the time-series information-based self-position estimation unit 221, a time-series information DB 222, a feature amount extraction unit 223, a current information-based self-position estimation unit 224, the position/image feature amount DB 225, a self-position estimation result integration unit 226, a non-feature region mask generation unit 227, a place-related non-feature portion DB 228, a position/image feature amount registration unit 229, and a position/place conversion unit 230.

Furthermore, the self-position estimation unit 132 has a mode for executing self-position estimation processing for estimating a self-position, and a mode for executing position/image feature amount registration processing for registering an image feature amount associated with position information in the position/image feature amount DB 225 (FIG. 4) necessary for the self-position estimation processing.

For this reason, the self-position estimation unit 132 includes a position/image feature amount registration processing block 211 having a configuration for executing the position/image feature amount registration processing, and a self-position estimation processing block 212 for executing the self-position estimation processing.

The position/image feature amount registration processing block 211 includes the depth image generation unit 220, the time-series information-based self-position estimation unit 221, the time-series information DB 222, the feature amount extraction unit 223, the non-feature region mask generation unit 227, the place-related non-feature portion DB 228, the position/image feature amount registration unit 229, and the position/place conversion unit 230.

Furthermore, the self-position estimation processing block 212 includes the depth image generation unit 220, the time-series information-based self-position estimation unit 221, the time-series information DB 222, the feature amount extraction unit 223, and the current information-based self-position estimation unit 224.

The time-series information-based self-position estimation unit 221 stores, in the time-series information DB 222, time-series information such as three-dimensional point cloud data representing a self-position and a position of an obstacle in surroundings, the time-series information being supplied from the LIDAR 201 and the wheel encoder 202. Furthermore, the time-series information-based self-position estimation unit 221 reads out the time-series information from the past to the present as necessary from the time-series information DB 222, and estimates a self-position on the basis of the read time-series information from the past to the present. Then, the self-position is supplied to the self-position estimation result integration unit 226.

Note that a specific method of self-position estimation using simultaneous localisation and mapping (SLAM) by the time-series information-based self-position estimation unit 221 is described in "Simultaneous Localization and Mapping Problem using Extended Kalman Filter" by Yusuke Morimoto and Toru Namerikawa, "Simultaneous Localisation and Mapping (SLAM): Part I The Essential Algorithms Hugh Durrant-Whyte, Fellow, IEEE, and Tim Bailey", and "Simultaneous Localisation and Mapping (SLAM): Part II State of the Art Tim See Bailey and Hugh Durrant-Whyte". Note that a self-position estimated by the time-series information-based self-position estimation unit 221 on the basis of time-series information is referred to as a time-series information-based self-position.

The depth image generation unit 220 generates a depth image (range image) on the basis of a parallax image supplied from the stereo camera 203, and outputs the depth image to the feature amount extraction unit 223 and the non-feature region mask generation unit 227.

The feature amount extraction unit 223 extracts, in the self-position estimation processing, an image feature amount from a depth image supplied from the depth image generation unit 220, and outputs the image feature amount to the current information-based self-position estimation unit 224 and the position/image feature amount registration unit 229.

The feature amount extraction unit 223 extracts, in the position/image feature amount registration processing, an image feature amount from a depth image partially masked by a non-feature region mask and supplied from the non-feature region mask generation unit 227, and outputs the image feature amount to the current information-based self-position estimation unit 224 and the position/image feature amount registration unit 229.

The current information-based self-position estimation unit 224 estimates a self-position on the basis of position information corresponding to an extracted feature amount from the position/image feature amount DB 225 in which a position and an image feature amount are stored in association with each other, and supplies the self-position to the self-position estimation result integration unit 226. Note that a self-position estimated by the current information-based self-position estimation unit 224 on the basis of current information is referred to as a current information-based self-position.

The self-position estimation result integration unit 226 integrates, in the self-position estimation processing, a time-series information-based self-position and a current information-based self-position in accordance with, for example, the degree of reliability corresponding to a situation of each of the LIDAR 201, the wheel encoder 202, and the stereo camera 203, and outputs the integration result as a self-position estimation result to the situation recognition unit 152. Note that the self-position estimation result integration unit 226 registers, in the position/image feature amount DB 225, the obtained position information in association with an image feature amount in a depth image detected at that timing. That is, registering a position estimated as a self-position in association with a feature amount in a depth image at that timing ensures that an image feature amount in a corresponding depth image exists for any once-passed-position. It is therefore possible to estimate a self-position with high accuracy.

In the position/image feature amount registration processing, on the basis of a place identified by a time-series information-based self-position supplied from the time-series information-based self-position estimation unit 221, the non-feature region mask generation unit 227 reads out an associated and registered place-related non-feature portion from the place-related non-feature portion DB 228 in which a place and a place-related non-feature portion are registered in association with each other.

Here, the position/place conversion unit 230 stores a database in which positional information and a place are stored in association with each other, and reads out corresponding place information on the basis of a time-series information-based self-position, thereby converting the time-series information-based positional information into place information and outputting the place information. In the database stored by the position/place conversion unit 230, for example, positional information regarding latitude and longitude identified by a time-series information-based self-position and corresponding place information such as a room number or a corridor of a building floor, or a road are stored in association with each other.

With this arrangement, the position/place conversion unit 230 converts a time-series information-based self-position supplied from the time-series information-based self-position estimation unit 221 into corresponding place information, and outputs the place information to the non-feature region mask generation unit 227.

The non-feature region mask generation unit 227 reads out, from the place-related non-feature portion DB 228 in which a place and a place-related non-feature portion are registered in association with each other, a place-related non-feature portion registered on the basis of place information supplied from the position/place conversion unit 230.

Then, the non-feature region mask generation unit 227 generates a non-feature region mask on the basis of the read place-related non-feature portion, the non-feature region mask is added to a depth image generated by the depth image generation unit 220 from a stereo image by the stereo camera 203, and the depth image is output to the feature amount extraction unit 223.

A place-related non-feature portion registered in association with a place in the place-related non-feature portion DB 228 is, for example, as illustrated in the left part of FIG. 5, information that is defined in a table registered in advance in association with a place and identifies an area including many feature amounts that are not useful for distinction from other positions, in a depth image used for identifying a position. That is, as illustrated in FIG. 2, in a corridor in an office building or the like, lighting fixtures on the ceiling are detected as many feature amounts. Since a plurality of floors has the same structure in many cases, using the feature amounts of the lighting fixtures on the ceiling makes it difficult to identify the floor, and erroneous detection is likely to occur. That is, in an environment such as a building, the ceiling has few useful feature amounts used for identifying the position, and using information regarding feature amounts in an area excluding the ceiling makes it easier to identify the floor. For this reason, in such a case, the area of the ceiling is set as a place-related non-feature portion. Besides the ceiling, examples of place-related non-feature portions include blinds, patterned walls, tile floors, and the like in buildings, and newly developed residential areas, tiled grounds, and the like in outdoor areas. The above is an example, and the place-related non-feature portions are not limited to the above.

More specifically, in the left part of FIG. 5, on an eighth floor of ABC Building identified as a place, the ceiling is set as a place-related non-feature portion because an area excluding the ceiling in a depth image includes many feature amounts useful for distinction from other positions for estimation of a current information-based self-position.

Furthermore, in the left part of FIG. 5, in an elevator hall identified as a place, a south-facing wall and a floor are set as place-related non-feature portions because an area excluding the south-facing wall and the floor in a depth image includes many feature amounts useful for distinction from other positions for estimation of a current information-based self-position.

The non-feature region mask generation unit 227 generates a non-feature region mask for every place on the basis of information regarding a place-related non-feature portion, adds the non-feature region mask to a depth image supplied from the depth image generation unit 220, and supplies the depth image to the feature amount extraction unit 223.

Consequently, in the case of the left part of FIG. 5, for example, in a case where it is identified that the place is the eighth floor of ABC Building on the basis of a time-series information-based self-position estimation result, the non-feature region mask generation unit 227 sets, as a place-related non-feature portion, the ceiling portion that includes less useful feature amounts in a depth image used for identifying a current information-based self-position, in other words, includes feature amounts that are not useful for distinction from other positions, and then supplies the feature amount extraction unit 223 with the depth image to which a non-feature region mask has been added.

Similarly, in the case of the left part of FIG. 5, for example, in a case where it is identified that the place is the elevator hall on the basis of a time-series information-based self-position estimation result, the non-feature region mask generation unit 227 sets, as place-related non-feature portions, the south-facing wall and the floor that include less useful feature amounts in a depth image used for identifying a current information-based self-position, in other words, include feature amounts that are not useful for distinction from other positions, and then supplies the feature amount extraction unit 223 with the depth image to which non-feature region masks have been added.

In the position/image feature amount registration processing, the position/image feature amount registration unit 229 registers, in the position/image feature amount DB 225, information regarding an image feature amount supplied from the feature amount extraction unit 223 in association with a time-series information-based self-position estimation result.

In this way, in the position/image feature amount registration processing, the feature amount extraction unit 223 extracts, on the basis of a supplied depth image, an image feature amount from an area to which no non-feature region mask has been added in the depth image. As a result, in a depth image, with a mask added to an area including many image feature amounts that are not useful for distinction from other positions, image feature amounts are extracted, and many image feature amounts useful for distinction from other positions are generated. This enables suppression of occurrence of erroneous detection.

Furthermore, a place-related non-feature portion to be registered in the place-related non-feature portion DB 228 may be a condition other than those illustrated in the left part of FIG. 5, and is only required to be in a data format that allows for designation of an area in a physical place by a computer. For example, as illustrated in the right part of FIG. 5, a place may be identified by an area of latitude<x and longitude<y. Furthermore, in another example, for example, it is possible to set a place that satisfies a certain condition, for example, a place where the intensity of radio waves from a wireless access point XXX is within Y. Furthermore, the right part may be any information in any data format that allows for designation of a place where a mask can be generated in a depth image by a computer. For example, a predetermined plane direction (for example, either parallel to the direction of gravity or perpendicular to the direction of gravity) may be set. In another example, an area of a south-facing wall may be set.

Figure 4:
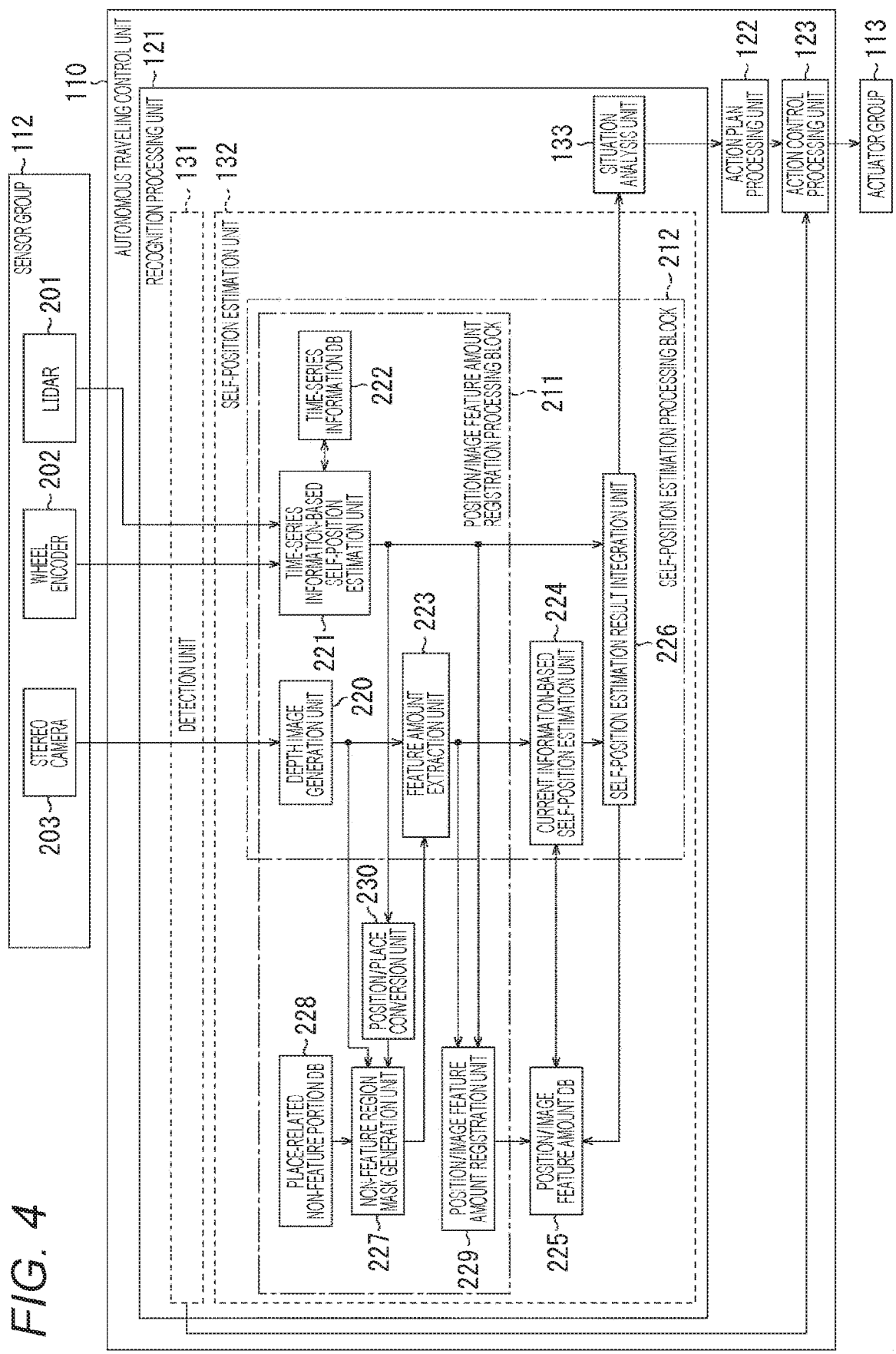
FIG. 4 is a detailed block diagram of a configuration example of a recognition processing unit according to a first embodiment of the present disclosure.

<Autonomous traveling estimation processing by autonomous traveling control unit in FIG. 4>

Figure 6:
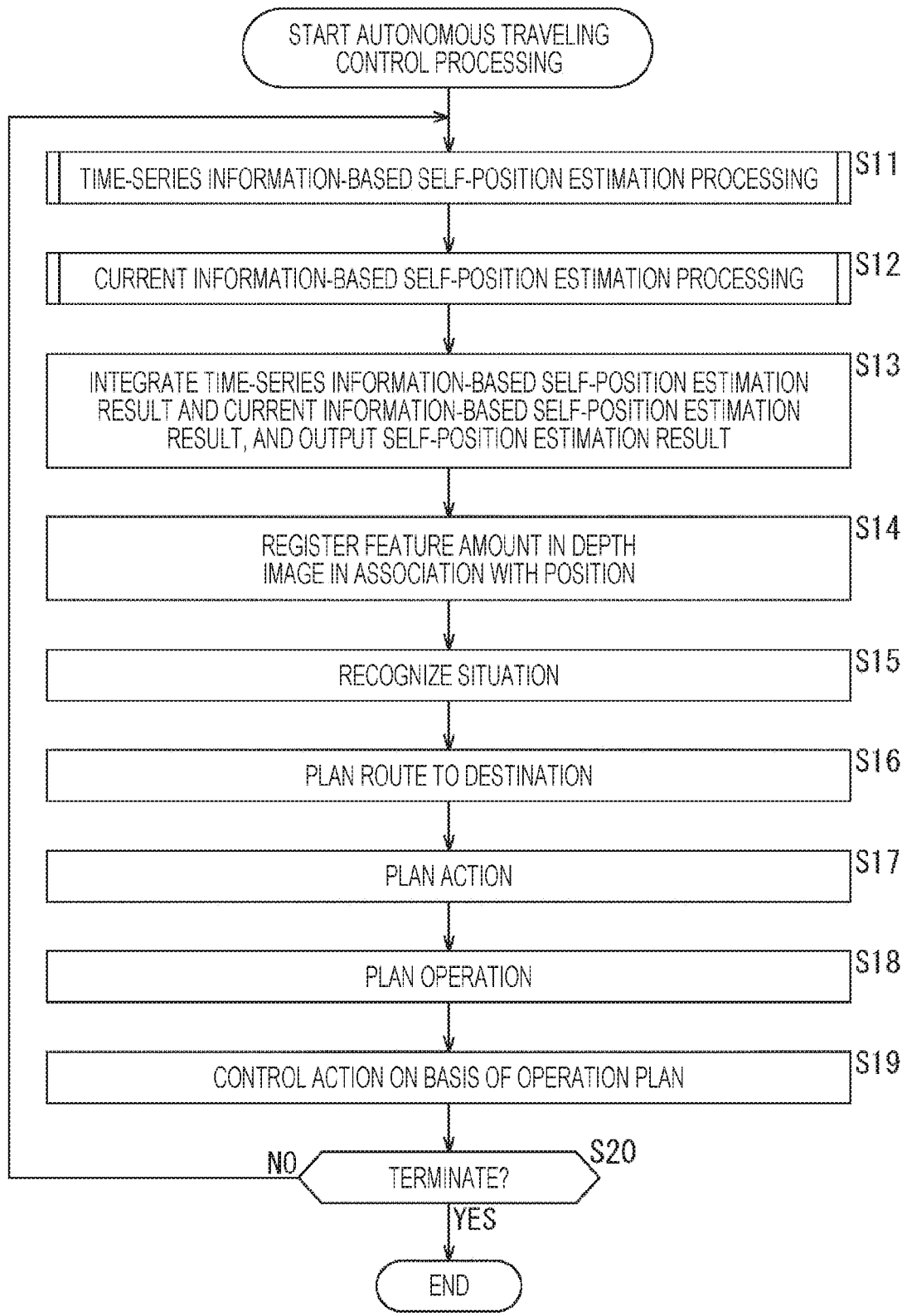
FIG. 6 is a flowchart illustrating autonomous traveling control processing performed by the recognition processing unit in FIG. 4.

Next, the self-position estimation processing will be described with reference to a flowchart in FIG. 6.

In step S11, the time-series information-based self-position estimation unit 221 executes time-series information-based self-position estimation processing to estimate a time-series information-based self-position, and outputs the time-series information-based self-position to the self-position estimation result integration unit 226. Note that the time-series information-based self-position estimation processing will be described later with reference to a flowchart in FIG. 7.

In step S12, the current information-based self-position estimation unit 224 executes current information-based self-position estimation processing to estimate a current information-based self-position, and outputs the current information-based self-position to the self-position estimation result integration unit 226. Note that the current information-based self-position estimation processing will be described later with reference to a flowchart in FIG. 8.

In step S13, the self-position estimation result integration unit 226 integrates the time-series information-based self-position and the current information-based self-position with, for example, a Kalman filter or a particle filter, and outputs the integrated self-position information as a self-position estimation result to the situation recognition unit 152.

In step S14, the self-position estimation result integration unit 226 registers the self-position estimation result in the position/image feature amount DB 225 in association with a feature amount in a depth image obtained from a parallax image that is current information used for identifying the self-position estimation result.

In step S15, the situation recognition unit 152 performs processing of recognizing a situation of the mobile object and a situation around the mobile object on the basis of the self-position estimation result, and outputs the recognition result to the action plan processing unit 122.

In step S16, the route planning unit 161 of the action plan processing unit 122 plans a route to a destination and outputs the route to the action planning unit 162.

In step S17, the action planning unit 162 plans an action on the basis of the route to the destination, and outputs the action as an action plan to the operation planning unit 163.

In step S18, the operation planning unit 163 plans an operation on the basis of the action plan supplied from the action planning unit 162, and outputs the operation as an operation plan to the action control processing unit 123.

In step S19, on the basis of the operation plan, the action control processing unit 123 controls an operation of each of the actuators 23a of the actuator group 113 to control an action of the mobile object 11.

In step S20, it is determined whether or not termination has been instructed. In a case where it is determined that termination has not been instructed, the processing returns to step S11. That is, the processing of steps S11 to S20 is repeated until termination is instructed, and the mobile object 11 continues to travel autonomously.

On the other hand, in a case where termination has been instructed in step S20, autonomous traveling control processing ends.

That is, the position estimated as the self-position and the feature amount in the depth image obtained from the parallax image that is the current information used for identifying the position are associated with each other and registered in the position/image feature amount DB 225. With this arrangement, a feature amount obtained from a depth image obtained from a parallax image that is current information corresponding to a once-passed-position is associated with the position and accumulated as new information. As a result, when the mobile body passes through the same position again, the self-position can be estimated with high accuracy.

Furthermore, by the above processing, a time-series information-based self-position and a current information-based self-position are sequentially obtained, integrated with each other, and output as a self-position estimation result. On the basis of the self-position estimation result, autonomous traveling of the mobile object 11 is controlled.

<Time-Series Information-Based Self-Position Estimation Processing>

Figure 7:
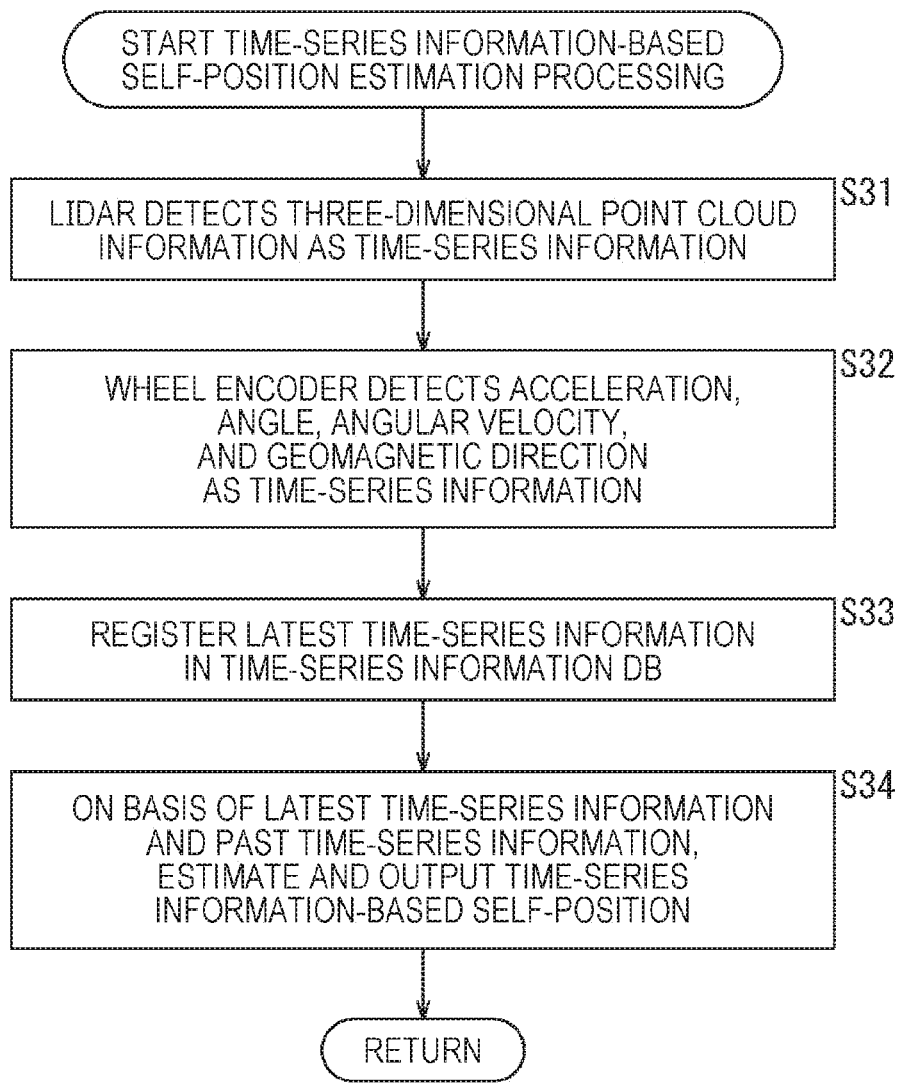
FIG. 7 is a flowchart illustrating time-series information-based self-position estimation processing.

Next, the time-series information-based self-position estimation processing will be described with reference to the flowchart in FIG. 7.

In step S31, the LIDAR 201 detects a distance to an object around the mobile object 11 as three-dimensional point cloud data, which is then output as time-series information to the time-series information-based self-position estimation unit 221 of the self-position estimation unit 132 via the detection unit 131.

In step S32, the wheel encoder 202 detects positional information, a posture, a velocity, an acceleration, and an angular velocity of the mobile object 11, and outputs them as time-series information to the time-series information-based self-position estimation unit 221 via the detection unit 131.

In step S33, the time-series information-based self-position estimation unit 221 acquires and registers the latest time-series information in the time-series information DB 222.

In step S34, the time-series information-based self-position estimation unit 221 estimates a self-position from the latest time-series information registered in the time-series information DB 222 and past time-series information by using, for example, a Kalman filter or a particle filter. Then, the time-series information-based self-position estimation unit 221 outputs the self-position, which is an estimation result, as time-series information-based self-position information to the self-position estimation result integration unit 226.

By the above processing, pieces of time-series information to be detected by the LIDAR 201 and the wheel encoder 202 are sequentially detected, and sequentially accumulated in the time-series information DB 222. On the basis of the time-series information accumulated in a time-series order from the past to the present, a self-position is estimated and output to the self-position estimation result integration unit 226 as a time-series information-based self-position.

<Current Information-Based Self-Position Estimation Processing>

Figure 8:
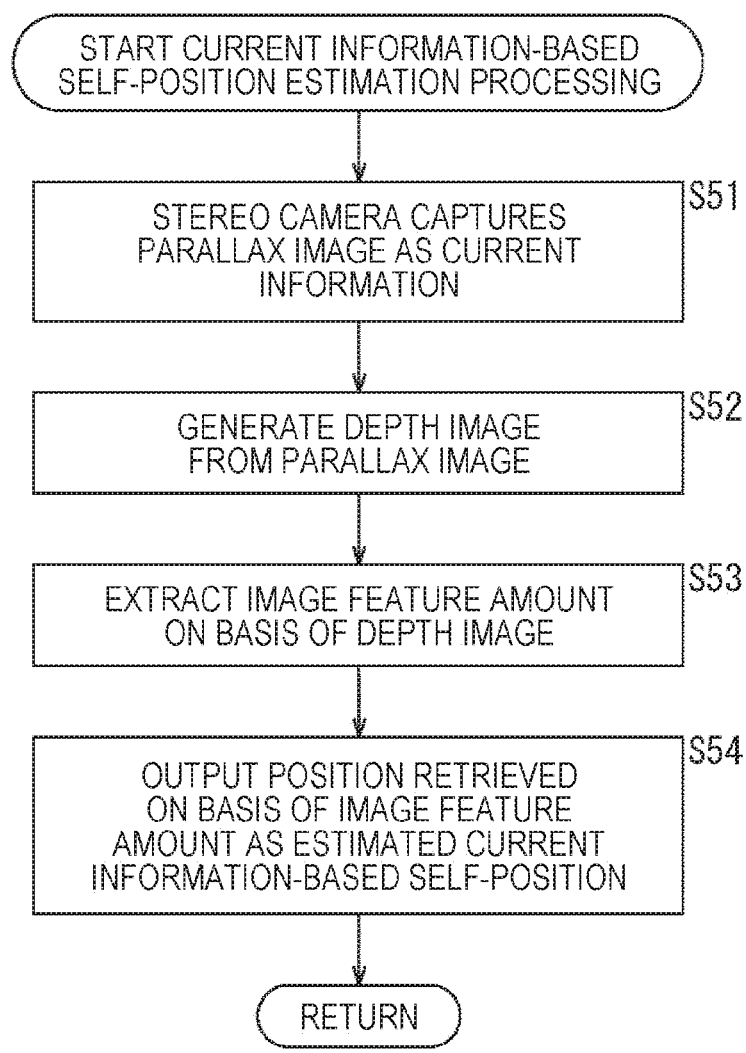
FIG. 8 is a flowchart illustrating current information-based self-position estimation processing.

Next, the current information-based self-position estimation processing will be described with reference to the flowchart in FIG. 8.

In step S51, the stereo camera 203 captures a parallax image around the mobile object 11, and outputs the parallax image as current information to the depth image generation unit 220 via the detection unit 131.

In step S52, the depth image generation unit 220 generates a depth image (range image) on the basis of the parallax image supplied from the stereo camera 203.

In step S53, the feature amount extraction unit 223 extracts an image feature amount on the basis of the generated depth image.

In step S54, the current information-based self-position estimation unit 224 estimates a self-position on the basis of position information corresponding to the extracted image feature amount from the position/image feature amount DB 225 in which a position and an image feature amount are stored in association with each other. Then, the current information-based self-position estimation unit 224 supplies the self-position, which is an estimation result, as a current information-based self-position to the self-position estimation result integration unit 226.

By the above processing, the stereo camera 203 captures a parallax image as current information, a depth image is generated from the parallax image, an image feature amount in the generated depth image is extracted, a current information-based self-position is estimated on the basis of positional information registered in association with the image feature amount, and the current information-based self-position is output to the self-position estimation result integration unit 226.

<Position/Image Feature Amount Registration Processing by Autonomous Traveling Control Unit in FIG. 4>

Figure 9:
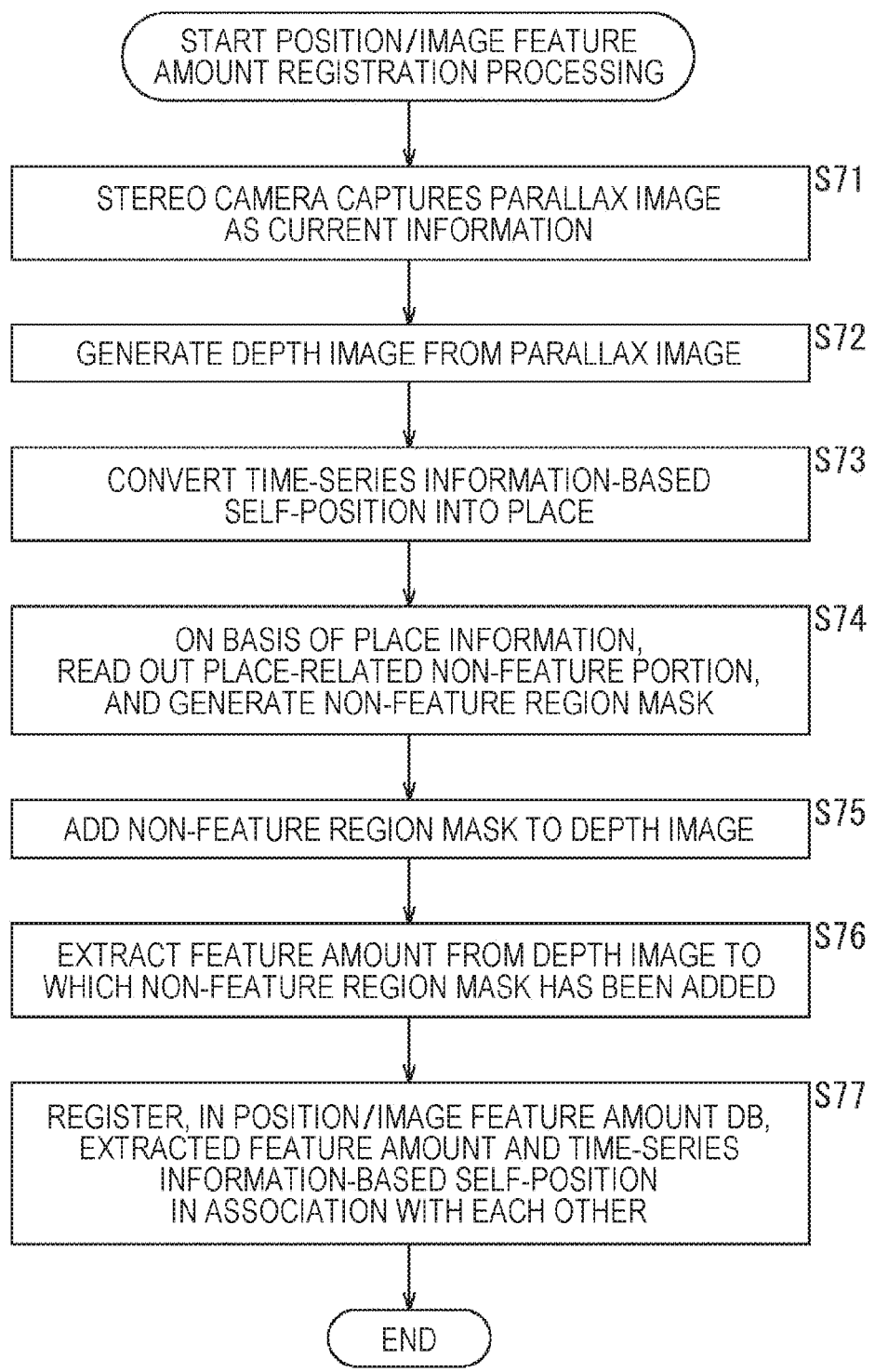
FIG. 9 is a flowchart illustrating position/image feature amount registration processing performed by the recognition processing unit in FIG. 4.

Next, the position/image feature amount registration processing by the autonomous traveling control unit 110 in FIG. 4 will be described with reference to a flowchart in FIG. 9.

In step S71, the stereo camera 203 captures a parallax image around the mobile object 11, and outputs the parallax image as current information to the depth image generation unit 220 via the detection unit 131.

In step S72, the depth image generation unit 220 generates a depth image (range image) on the basis of the parallax image supplied from the stereo camera 203.

In step S73, the position/place conversion unit 230 acquires a time-series information-based self-position estimated by the time-series information-based self-position estimation unit 221, converts the time-series information-based self-position into information regarding a place corresponding to the time-series information-based self-position, and outputs the information to the non-feature region mask generation unit 227.

In step S74, the non-feature region mask generation unit 227 accesses the place-related non-feature portion DB 228, and reads out a place-related non-feature portion registered in association with the place corresponding to the time-series information-based self-position. Then, on the basis of the place-related non-feature portion, the non-feature region mask generation unit 227 generates a non-feature region mask for masking an area, in the depth image, including many feature amounts that are not useful for identifying a position.

In step S75, the non-feature region mask generation unit 227 adds the generated non-feature region mask to the depth image, and then outputs the depth image to the feature amount extraction unit 223.

In step S76, the feature amount extraction unit 223 extracts an image feature amount from the depth image to which the non-feature region mask has been added, and outputs the extracted image feature amount to the position/image feature amount registration unit 229.

In step S77, the position/image feature amount registration unit 229 registers, in the position/image feature amount DB 225, the time-series information-based self-position and the image feature amount in association with each other.

By the above processing, an image feature amount to be registered in association with a position is extracted from a depth image with a mask added to an area including many image feature amounts that are not useful for distinction from other positions. Thus, an image feature amount useful for distinction from other positions is generated.

As a result, a current information-based self-position can be estimated using an image feature amount that is useful for distinction from other positions, and a self-position can be estimated with high accuracy even in an environment where there are many similar objects in surroundings.

<Application Example of Place-Related Non-Feature Portion>

In the above description, a place-related non-feature portion is associated with a place, and is information regarding an area in a depth image, the area including many image feature amounts useful for distinction among positions. Alternatively, by defining a place attribute, which is an abstraction of a place, and by setting a table that associates the place attribute with information regarding an area that includes many image feature amounts useful for distinction among positions, place-related non-feature portions can be used even in a state where the place-related non-feature portions have not been set for all places.

Figure 10:
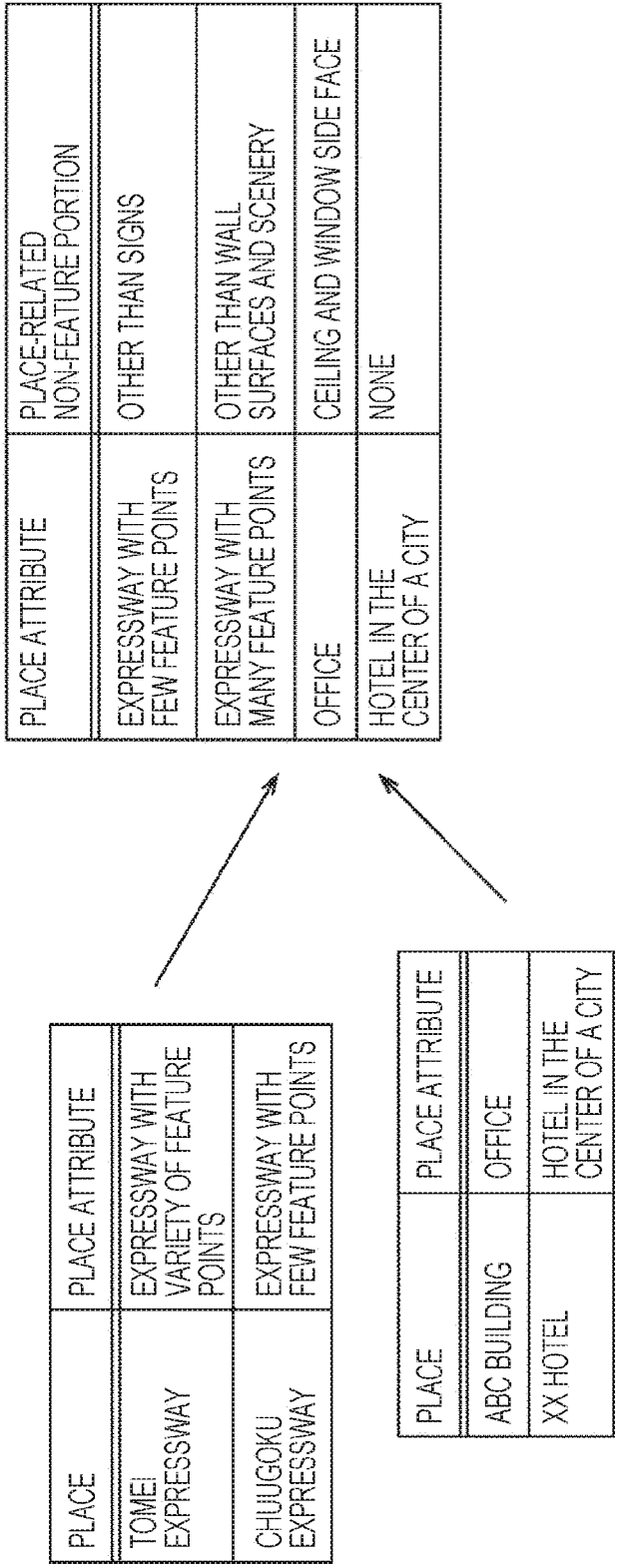
FIG. 10 is a diagram illustrating an application example of a place-related non-feature portion.

That is, for example, as illustrated in the right part of FIG. 10, an abstracted place attribute may be defined for each of places an "expressway with few feature points", an "expressway with many feature points", an "office building", and a "hotel in the center of a city", and a table may be set in which each place attribute is associated with a place-related non-feature portion. As a place-related non-feature portion set for each place attribute, for example, "other than signs (areas other than signs are masked, and feature amounts in areas of the signs are used)" may be set in association with an "expressway with few feature points" as illustrated in the right part of FIG. 10. Furthermore, "other than wall surfaces and scenery (areas other than wall surfaces and scenery are masked, and feature amounts in areas of the wall surfaces and scenery are used)" may be set in association with an "expressway with many feature points". Moreover, a "ceiling and window side face (a ceiling and a window side face are masked, and feature amounts in areas other than the ceiling and the window side face are used)" may be set for an "office building". Furthermore, "none (feature amounts in the whole area are used, with no mask in the whole area)" may be set in association with a "hotel in the center of a city".

By setting a table in which a place attribute and a place-related non-feature portion are associated with each other as illustrated in the right part of FIG. 10, and, for example, by associating "Tomei Expressway" with an "expressway with few feature points", "Chuugoku Expressway" with an "expressway with few feature points", "ABC Building" with an "office building", and "XX Hotel" with a "hotel in the center of a city" as illustrated in the left part of FIG. 10, even in a case where no place-related non-feature portion has been associated with a place, a place-related non-feature portion can be read out by identifying a place attribute, which is an abstraction concept of the place. Thus, a non-feature region mask can be set appropriately.

In other words, by defining a place attribute, which is an abstraction of a place, and a place-related non-feature portion, even in a case where a specific place cannot be identified, the place-related non-feature portion can be identified only by identifying the place attribute, which is more abstract than a place. This allows for an improvement in the degree of freedom in using place-related non-feature portions.

In the example described above, a specific position or direction in an image is designated as a place-related non-feature portion, which is associated with a place, and is information regarding an area in a depth image, the area including many image feature amounts useful for distinction among positions. A place-related non-feature portion may be any area that does not include what is not useful for distinction among positions. For example, a place-related non-feature portion may be an area of an object that has been reflected in an image and displayed on a display, or an area of an object that changes over time such as trees, sunbeams through leaves, a region of the sky, and a moving object.

3. Second Embodiment

In the example described above, a place-related non-feature portion is associated with a place and registered in advance in the place-related non-feature portion DB 228. Since a position and an image feature amount are newly registered in the position/image feature amount DB 225 each time a self-position is identified, it is also possible to newly generate a place-related non-feature portion by using an image feature amount registered in the position/image feature amount DB 225 in association with a newly registered position, and register the place-related non-feature portion in the place-related non-feature portion DB 228.

Figure 11:
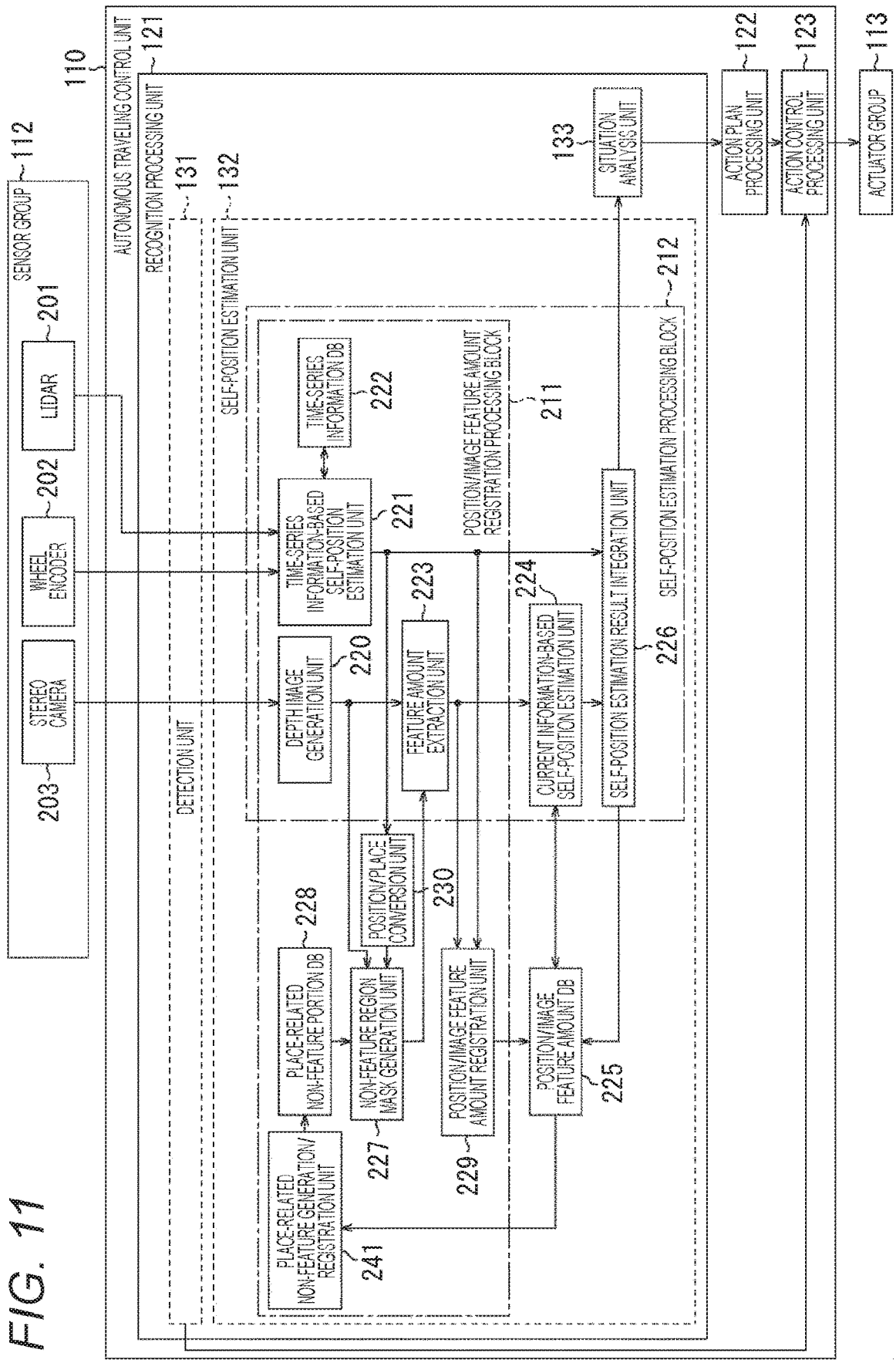
FIG. 11 is a detailed block diagram of a configuration example of a recognition processing unit according to a second embodiment of the present disclosure.

FIG. 11 illustrates a configuration example of a self-position estimation unit 132 in which a place-related non-feature portion is newly generated using an image feature amount registered in association with a position newly registered in a position/image feature amount DB 225, and is registered in a place-related non-feature portion DB 228. Note that, in the self-position estimation unit 132 in FIG. 11, configurations having the same functions as those in the self-position estimation unit 132 in FIG. 4 are denoted by the same reference numerals, and description thereof will be omitted as appropriate.

That is, the self-position estimation unit 132 in FIG. 11 differs from the self-position estimation unit 132 in FIG. 4 in that a place-related non-feature portion generation/registration unit 241 is additionally provided.

The place-related non-feature portion generation/registration unit 241 obtains a place corresponding to a position registered in the position/image feature amount DB 225 updated each time a place is identified, reads out a plurality of image feature amounts registered in association with the same place, makes a statistical comparison, extracts an area in which there are many image feature amounts having a similarity equal to or higher than a predetermined threshold as a place-related non-feature portion, and registers the place-related non-feature portion in the place-related non-feature portion DB 228 in association with the place.

That is, an area in which there are many image feature amounts, among a plurality of image feature amounts associated with the same position, having a similarity higher than a predetermined threshold is unnecessary for identifying the same position. It is therefore possible to suppress occurrence of erroneous detection by setting the area as a place-related non-feature portion.

<Place-Related Non-Feature Portion Generation/Registration Processing>

Figure 12:
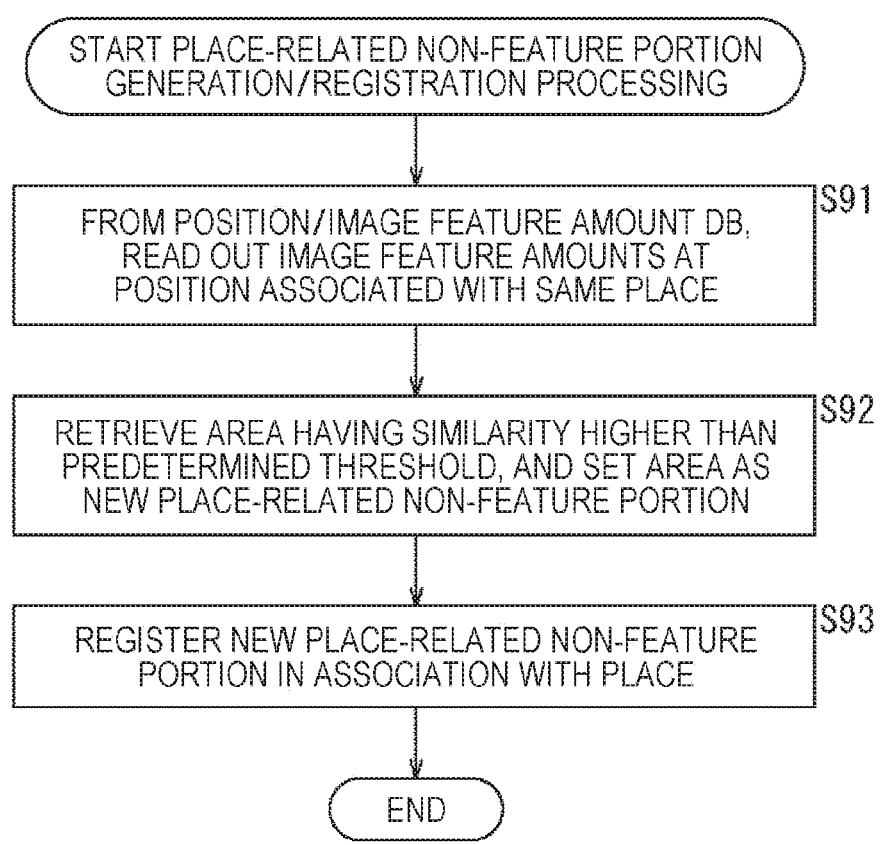
FIG. 12 is a flowchart illustrating place-related non-feature portion generation/registration processing.

Next, place-related non-feature portion generation/registration processing will be described with reference to a flowchart in FIG. 12.

In step S91, the place-related non-feature portion generation/registration unit 241 accesses the position/image feature amount DB 225, and reads out, for a place identified on the basis of a position, a plurality of image feature amounts associated with the same place.

In step S92, the place-related non-feature portion generation/registration unit 241 statistically processes the plurality of image feature amounts associated with the same place, and generates, as a new place-related non-feature portion, an area that includes many image feature amounts having a similarity higher than a predetermined threshold.

In step S93, the place-related non-feature portion generation/registration unit 241 registers the generated new place-related non-feature portion in the place-related non-feature portion DB 228 in association with the place.

The above processing generates a place-related non-feature portion constituted by an area that includes many image feature amounts having a similarity higher than a predetermined threshold, that is, an area that includes image feature amounts that are not necessary for distinction among places, the image feature amounts being those associated with the same place, among image feature amounts registered in the position/image feature amount DB 225. This enables minimization of the number of image feature amounts that identify the same place and suppression of occurrence of erroneous detection.

4. Third Embodiment

In the example described above, the position/image feature amount DB 225 is generated with image feature amounts that are not necessary for distinction at the same position excluded, so that a self-position may be estimated with high accuracy even in an environment where there are similar objects in surroundings.

Incidentally, when a mobile object is lifted up, slips, falls into a steep step, has just been turned on, or the like, its self-position may become indeterminate due to an abrupt change in state from an immediately preceding traveling state. In such a case, since an estimated time-series information-based self-position has a large error, only a current information-based self-position is used to estimate a self-position.

In such a case, whether or not a current information-based self-position is detected with high accuracy may be determined to determine whether or not the self-position is no longer indeterminate, and the use of a time-series information-based self-position may be resumed in accordance with a determination result.

To be more specific, a position/non-feature region feature amount DB is generated in advance in which, on the basis of information regarding a place-related non-feature portion, a non-feature region feature amount obtained by masking a feature region that includes image feature amounts that are not useful for identifying a self-position in a depth image is registered in association with a position. Then, in a case where the self-position has become indeterminate, it is possible to obtain, from a place-related non-feature portion associated with a current information-based self-position, a non-feature region feature amount obtained from a depth image, read out a non-feature region feature amount registered in the position/non-feature region feature amount DB in association with an estimated current information-based self-position, and then determine whether or not the estimated current information-based self-position is appropriate on the basis of a similarity between the two non-feature region feature amounts.

Figure 13:
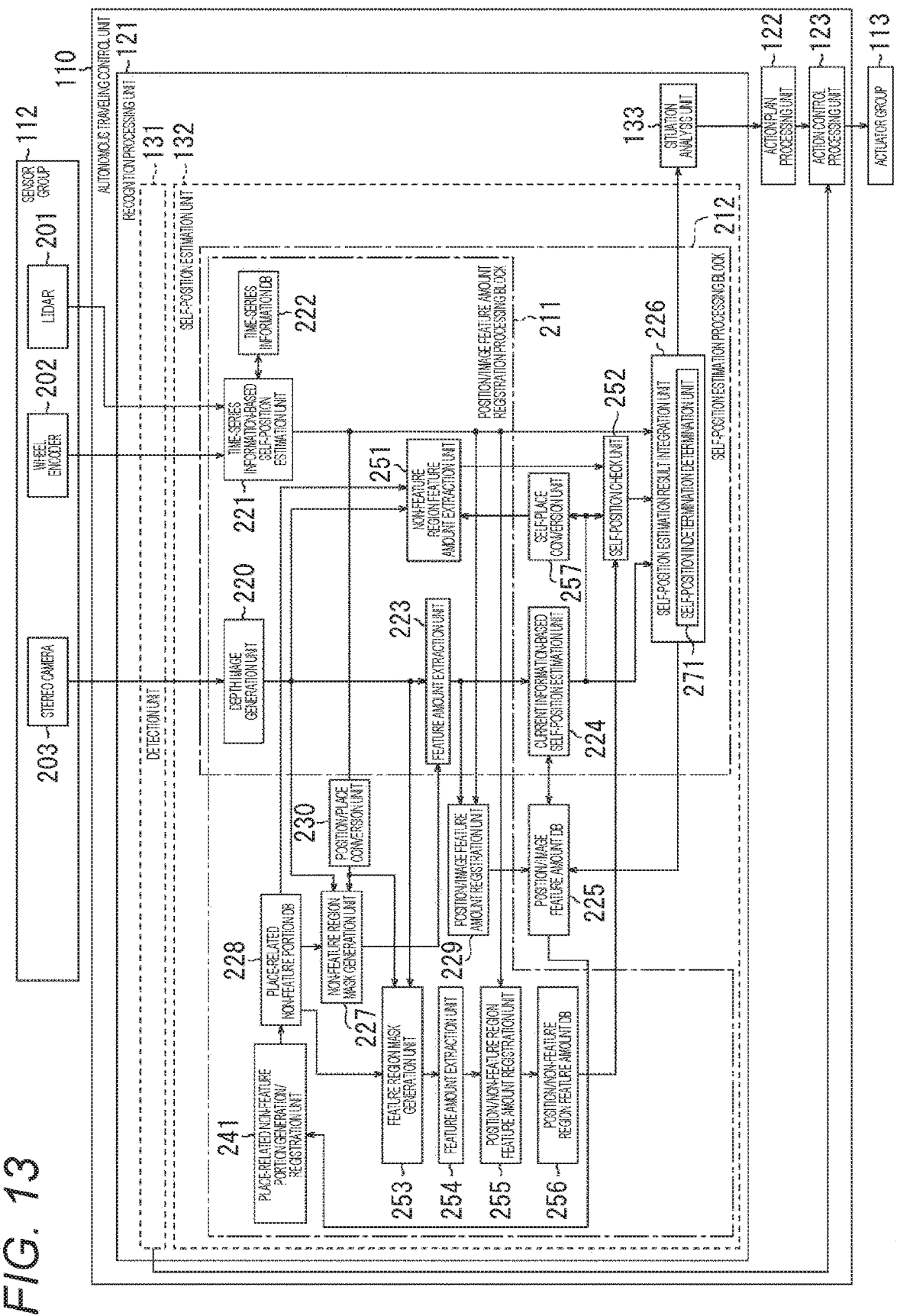
FIG. 13 is a detailed block diagram of a configuration example of a recognition processing unit according to a third embodiment of the present disclosure.

FIG. 13 illustrates a configuration example of a self-position estimation unit 132, in which a position/non-feature region feature amount DB is generated in advance, and when a self-position is indeterminate, on the basis of whether or not a current information-based self-position is appropriate, whether or not the self-position is no longer indeterminate is determined.

In the self-position estimation unit 132 in FIG. 13, configurations having the same functions as those of the self-position estimation unit 132 in FIG. 11 are denoted by the same reference numerals, and description thereof will be omitted as appropriate.

That is, the self-position estimation unit 132 in FIG. 13 differs from the self-position estimation unit 132 in FIG. 11 in that a non-feature region feature amount extraction unit 251, a self-position check unit 252, a feature region mask generation unit 253, a feature amount extraction unit 254, a position/non-feature region feature amount registration unit 255, a position/non-feature region feature amount DB 256, and a position/place conversion unit 257 (similar to the position/place conversion unit 230) are additionally provided, and that a self-position estimation result integration unit 226 is provided with a self-position indetermination determination unit 271.

The self-position indetermination determination unit 271 determines whether or not the self-position has become indeterminate on the basis of, for example, the amount of change in estimated time-series self-position, whether or not power has just been turned on, or the like. In a case where it is determined that the self-position is indeterminate, an operation is changed from a normal mode to a self-position indeterminate mode, and the self-position estimation result integration unit 226 is controlled to select a current information-based self-position as a self-position estimation result.

In the self-position indeterminate mode, from place information obtained by conversion by the position/place conversion unit 257 on the basis of a current information-based self-position, the non-feature region feature amount extraction unit 251 reads out a place-related non-feature portion from a place-related non-feature portion DB 228. Then, the non-feature region feature amount extraction unit 251 extracts, as a non-feature region feature amount, a feature amount obtained from an image obtained by applying a mask to a feature region in a depth image supplied from a depth image generation unit 220, and supplies the extracted non-feature region feature amount to the self-position check unit 252.

The self-position check unit 252 accesses the position/non-feature region feature amount DB 256 in the self-position indeterminate mode, and reads out a non-feature region feature amount registered in advance in association with an estimated current information-based self-position. Then, the self-position check unit 252 checks the current information-based self-position on the basis of a similarity to the non-feature region feature amount supplied from the non-feature region feature amount extraction unit 251, and outputs information regarding the similarity as a check result to the self-position estimation result integration unit 226.

The self-position indetermination determination unit 271 of the self-position estimation result integration unit 226 changes the operation from the self-position indeterminate mode back to the normal mode when the similarity is higher than a predetermined value and the accuracy of the obtained current information-based self-position is regarded to be sufficient.

In the position/image feature amount registration processing, on the basis of a place identified by a time-series information-based self-position supplied from the time-series information-based self-position estimation unit 221, the feature region mask generation unit 253 reads out an associated and registered place-related non-feature portion from the place-related non-feature portion DB 228 in which a place and a place-related non-feature portion are registered in association with each other. Then, the feature region mask generation unit 253 generates a feature region mask on the basis of the read place-related non-feature portion, the feature region mask is added to a depth image generated by the depth image generation unit 220 from a stereo image by a stereo camera 203, and the depth image is output to the feature amount extraction unit 254.

The feature amount extraction unit 254 extracts a feature amount from the depth image to which the feature region mask has been added, and outputs the feature amount as a non-feature region feature amount to the position/non-feature region feature amount registration unit 255.

In the position/image feature amount registration processing, the position/non-feature region feature amount registration unit 255 registers, in the position/non-feature region feature amount DB 256, a non-feature region feature amount, which is an image feature amount supplied from the feature amount extraction unit 254, in association with a time-series information-based self-position estimation result.

A place-related non-feature portion registered in association with a place in the place-related non-feature portion DB 228 is, for example, as illustrated in the left part of FIG. 5, information that is registered in advance in association with a place and identifies an area, in a depth image used for identifying a current information-based self-position, including many feature amounts that are not useful for distinction from other positions.

<Position/image feature amount registration processing by autonomous traveling control unit in FIG. 13>

Figure 14:
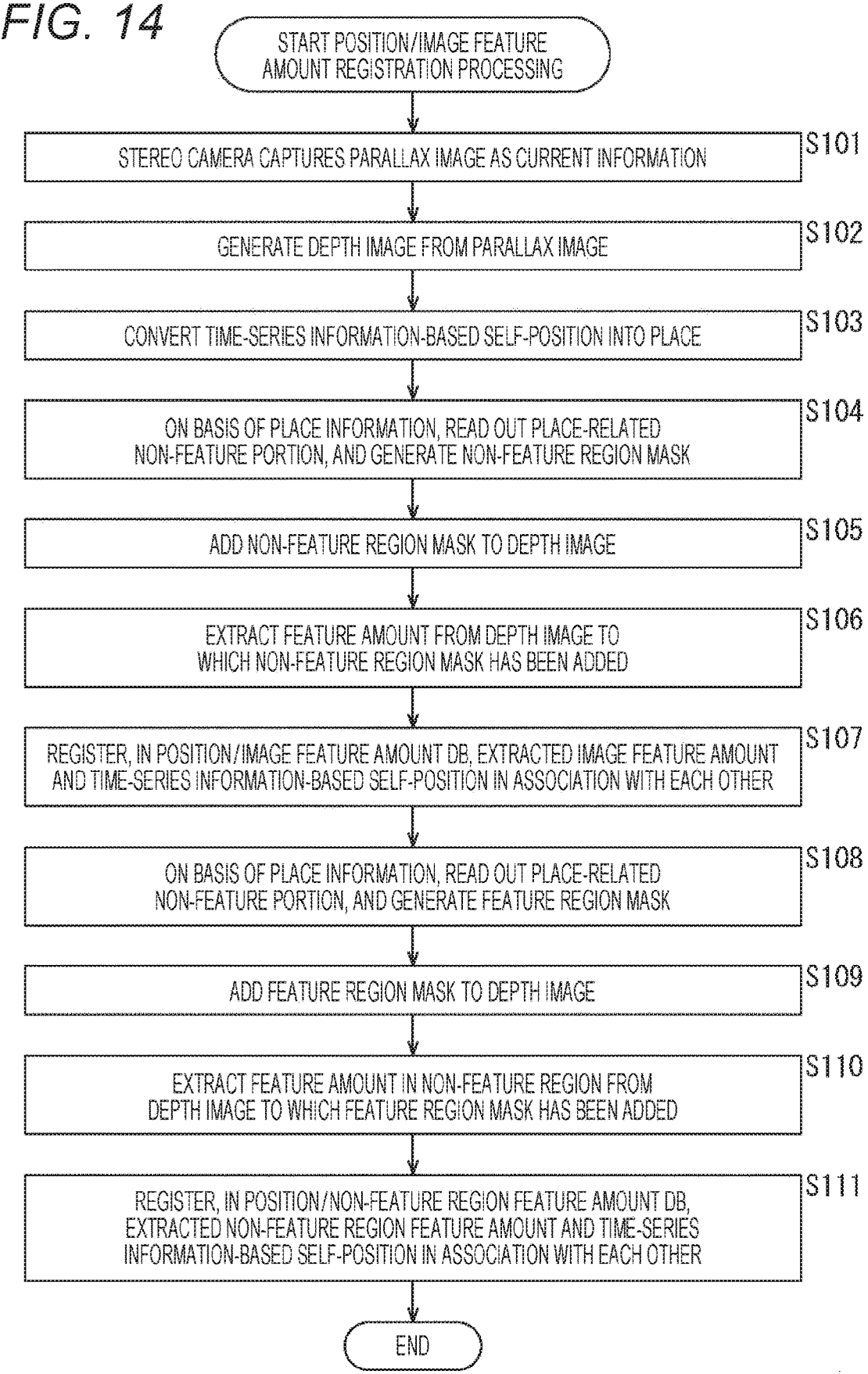
FIG. 14 is a flowchart illustrating position/image feature amount registration processing performed by the recognition processing unit in FIG. 13.

Next, position/image feature amount registration processing by an autonomous traveling control unit 110 in FIG. 13 will be described with reference to a flowchart in FIG. 14.

In step S101, the stereo camera 203 captures a parallax image around a mobile object 11, and outputs the parallax image as current information to the depth image generation unit 220 via a detection unit 131.

In step S102, the depth image generation unit 220 generates a depth image (range image) on the basis of the parallax image supplied from the stereo camera 203.

In step S103, the position/place conversion unit 230 acquires a time-series information-based self-position estimated by the time-series information-based self-position estimation unit 221, converts the time-series information-based self-position into place information corresponding to the time-series information-based self-position, and supplies the place information to a non-feature region mask generation unit 227 and the feature region mask generation unit 253.

In step S104, the non-feature region mask generation unit 227 accesses the place-related non-feature portion DB 228, reads out a place-related non-feature portion registered in association with a place, and generates a non-feature region mask for masking an area, in the depth image, including many feature amounts that are not useful for identifying a position.

In step S105, the non-feature region mask generation unit 227 adds the generated non-feature region mask to the depth image, and then outputs the depth image to a feature amount extraction unit 223.

In step S106, the feature amount extraction unit 223 extracts an image feature amount from the depth image to which the non-feature region mask has been added, and outputs the extracted image feature amount to a position/image feature amount registration unit 229.

In step S107, the position/image feature amount registration unit 229 registers, in the position/image feature amount DB 225, the estimated time-series information-based self-position and the image feature amount in association with each other.

In step S108, the feature region mask generation unit 253 accesses the place-related non-feature portion DB 228, reads out an associated and registered place-related non-feature portion on the basis of the time-series information-based self-position, and generates a feature region mask for masking an area, in the depth image, including many feature amounts that are not useful for identifying a position.

In step S109, the feature region mask generation unit 253 adds the generated feature region mask to the depth image, and then outputs the depth image to the feature amount extraction unit 254.

In step S110, the feature amount extraction unit 254 extracts an image feature amount from the depth image to which the feature region mask has been added, and outputs the image feature amount as a non-feature region feature amount to the position/non-feature region feature amount registration unit 255.

In step S111, the position/non-feature region feature amount registration unit 255 registers, in the position/non-feature region feature amount DB 256, the estimated time-series information-based self-position and the non-feature region feature amount in association with each other.

By the above processing, as for an image feature amount to be registered in association with a position, image feature amounts are extracted with a mask added to an area, in a depth image, including many image feature amounts that are not useful for distinction from other positions, and thus many image feature amounts that are useful for distinction from other positions are generated. Moreover, as for a non-feature region feature amount to be registered in association with a position, non-feature region feature amounts are extracted with a mask added to an area, in a depth image, including many image feature amounts that are useful for distinction from other positions, and thus many non-feature region feature amounts that are not useful for distinction from other positions are associated with the position to generate the position/non-feature region feature amount DB 256.

<Autonomous Traveling Control Processing by Autonomous Traveling Control Unit in FIG. 13>

Figure 15:
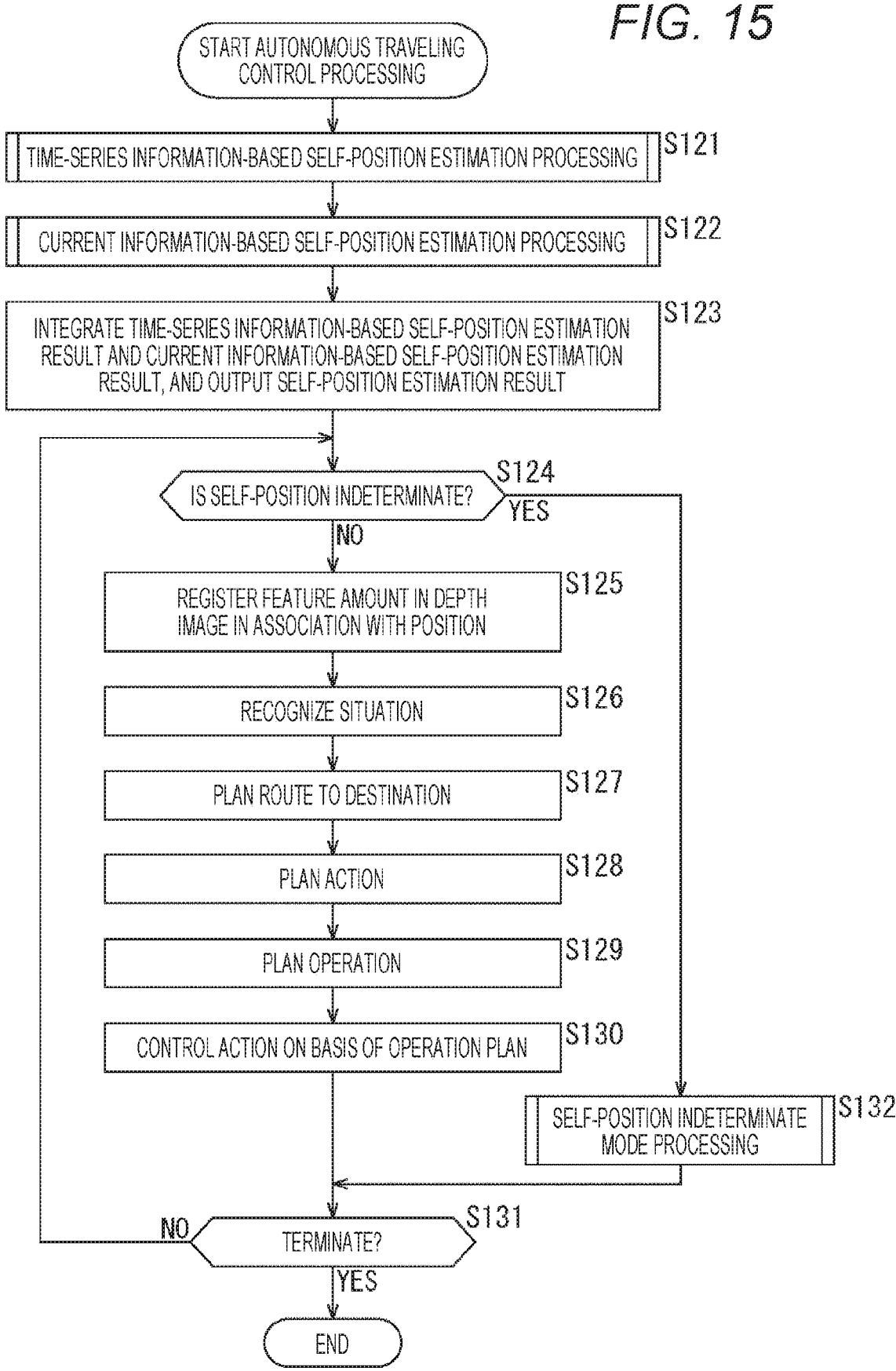
FIG. 15 is a flowchart illustrating autonomous traveling control processing performed by the recognition processing unit in FIG. 13.

Next, autonomous traveling control processing in the autonomous traveling control unit 110 in FIG. 13 will be described with reference to a flowchart in FIG. 15.

In step S121, the time-series information-based self-position estimation unit 221 executes time-series information-based self-position estimation processing to estimate a time-series information-based self-position, and outputs the time-series information-based self-position to the self-position estimation result integration unit 226. Note that the time-series information-based self-position estimation processing is similar to the processing described with reference to the flowchart in FIG. 7, and thus the description thereof will be omitted.

In step S122, a current information-based self-position estimation unit 224 executes current information-based self-position estimation processing to estimate a current information-based self-position, and outputs the current information-based self-position to the self-position estimation result integration unit 226. Note that the current information-based self-position estimation processing is similar to the processing described with reference to the flowchart in FIG. 8, and thus the description thereof will be omitted.

In step S123, the self-position estimation result integration unit 226 integrates the time-series information-based self-position and the current information-based self-position with, for example, a Kalman filter or a particle filter, and outputs the integrated self-position information as a self-position estimation result to a situation recognition unit 152.

In step S124, the self-position indetermination determination unit 271 determines whether or not the self-position is indeterminate. For example, the self-position indetermination determination unit 271 determines whether or not the self-position is indeterminate on the basis of, for example, whether or not the self-position estimation result has changed by an amount greater than a predetermined value, or whether or not power has just been turned on.

In a case where it is determined in step S124 that the self-position is not indeterminate, the processing proceeds to step S125.

In step S125, the self-position estimation result integration unit 226 registers the self-position estimation result in the position/image feature amount DB 225 in association with a feature amount in a depth image obtained from a parallax image that is current information used for identifying the self-position estimation result.

In step S126, the situation recognition unit 152 performs processing of recognizing a situation of the mobile object and a situation around the mobile object on the basis of the self-position estimation result, and outputs the recognition result to an action plan processing unit 122.

In step S127, a route planning unit 161 of the action plan processing unit 122 plans a route to a destination and outputs the route to an action planning unit 162.

In step S128, the action planning unit 162 plans an action on the basis of the route to the destination, and outputs the action as an action plan to an operation planning unit 163.

In step S129, the operation planning unit 163 plans an operation on the basis of the action plan supplied from the action planning unit 162, and outputs the operation as an operation plan to an action control processing unit 123.

In step S130, on the basis of the operation plan, the action control processing unit 123 controls an operation of each of actuators 23a of an actuator group 113 to control an action of the mobile object 11.

In step S131, it is determined whether or not termination has been instructed. In a case where it is determined that termination has not been instructed, the processing returns to step S121. That is, as long as the self-position does not become indeterminate, the processing of steps S121 to S131, that is, the processing to be performed in a case where the operation is in the normal mode is repeated, and the mobile object 11 continues to move autonomously.

On the other hand, in a case where it is determined in step S124 that the self-position is indeterminate, the processing proceeds to step S132.

In step S132, the self-position indetermination determination unit 271 switches the operation to the self-position indeterminate mode to execute self-position indeterminate mode processing, thereby enabling control for the autonomous traveling control processing based on the current information-based self-position. Then, until a state in which the current information-based self-position can be appropriately estimated is achieved, the self-position indeterminate mode processing is continued. In a case where a state in which the current information-based self-position can be appropriately estimated has been achieved, the operation is changed from the self-position indeterminate mode back to the normal mode (the processing of steps S121 to S131).

<Self-Position Indeterminate Mode Processing>

Figure 16:
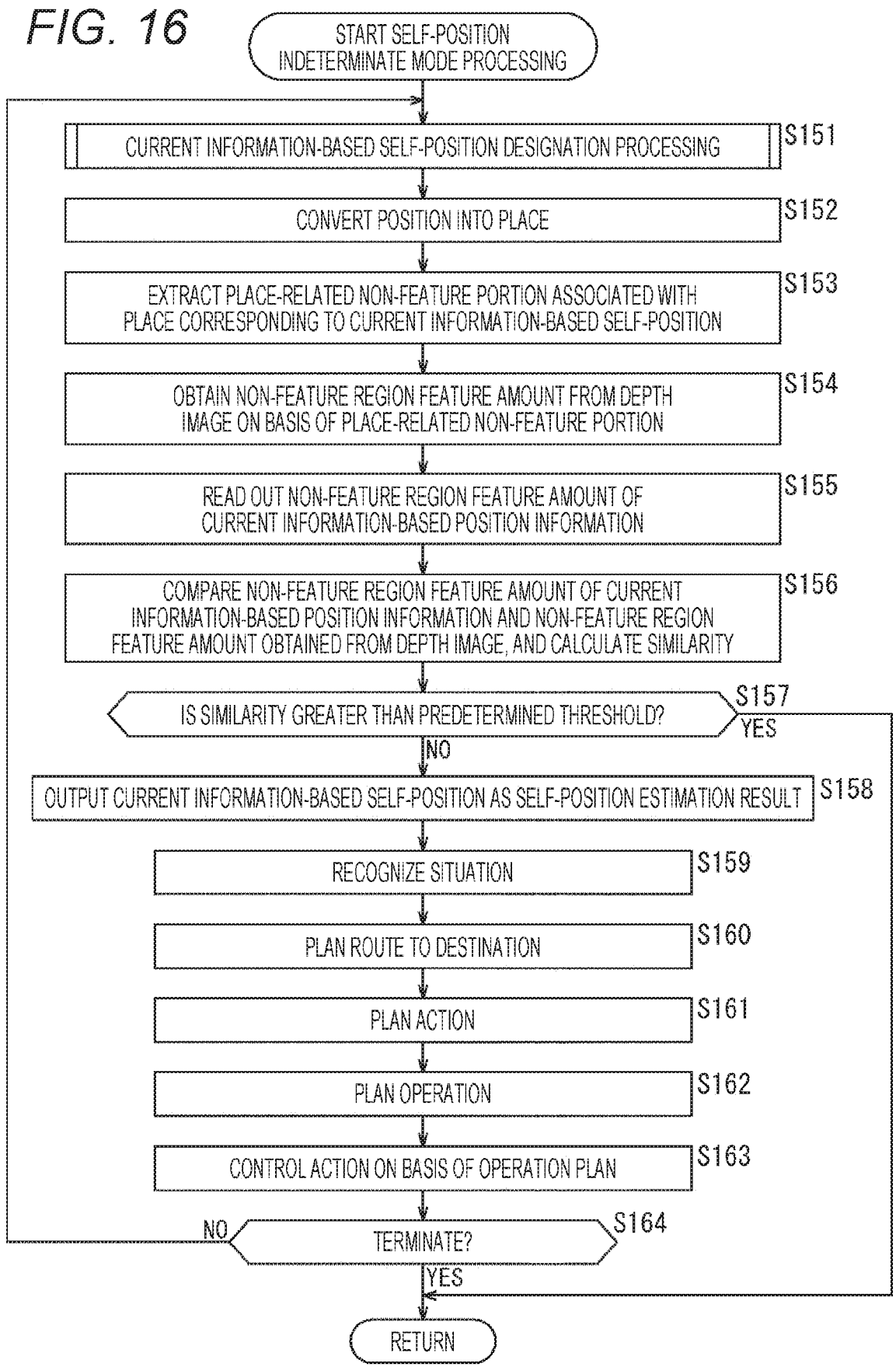
FIG. 16 is a flowchart illustrating self-position indeterminate mode processing.

Next, the self-position indeterminate mode processing will be described with reference to the flowchart in FIG. 16.

In step S151, the current information-based self-position estimation unit 224 executes the current information-based self-position estimation processing to estimate a current information-based self-position, and outputs the current information-based self-position to the self-position estimation result integration unit 226 and the position/place conversion unit 257. Note that the current information-based self-position estimation processing is similar to the processing described with reference to the flowchart in FIG. 8, and thus the description thereof will be omitted.

In step S152, the position/place conversion unit 257 reads out information regarding a place registered in association with the current information-based self-position, and outputs the information to the non-feature region feature amount extraction unit 251.

In step S153, the non-feature region feature amount extraction unit 251 accesses the place-related non-feature portion DB 228, and extracts a place-related non-feature portion registered in association with the place corresponding to the current information-based self-position.

In step S154, the non-feature region feature amount extraction unit 251 extracts an image feature amount with a mask added to a feature region in a depth image on the basis of the place-related non-feature portion registered in association with the place corresponding to the current information-based self-position, and outputs the image feature amount as a non-feature region feature amount to the self-position check unit 252.

In step S155, the self-position check unit 252 accesses the position/non-feature region feature amount DB 256, and reads out a non-feature region feature amount registered in association with the estimated current information-based self-position.

In step S156, the self-position check unit 252 calculates a similarity between the non-feature region feature amount registered in association with the estimated current information-based self-position and the non-feature region feature amount extracted from the depth image.

In step S157, on the basis of whether or not the similarity is higher than a predetermined threshold, the self-position check unit 252 determines whether or not the current information-based self-position has been obtained with a predetermined accuracy. That is, in a case where the current information-based self-position has been obtained with sufficient accuracy, the two match and the similarity should be higher than the predetermined threshold. However, in a case where the current information-based self-position has not been obtained with sufficient accuracy, the two do not match and the similarity becomes lower than the predetermined threshold. For example, in a case where it is determined that the similarity is lower than the predetermined threshold and the accuracy of the current information-based self-position is not sufficient, the processing proceeds to step S158.

In step S158, the self-position estimation result integration unit 226 outputs the current information-based self-position as a self-position estimation result to the situation recognition unit 152.

In step S159, the situation recognition unit 152 performs processing of recognizing a situation of the mobile object and a situation around the mobile object on the basis of the self-position estimation result, and outputs the recognition result to the action plan processing unit 122.

In step S160, the route planning unit 161 of the action plan processing unit 122 plans a route to a destination and outputs the route to the action planning unit 162.

In step S161, the action planning unit 162 plans an action on the basis of the route to the destination, and outputs the action as an action plan to the operation planning unit 163.

In step S162, the operation planning unit 163 plans an operation on the basis of the action plan supplied from the action planning unit 162, and outputs the operation as an operation plan to the action control processing unit 123.

In step S163, on the basis of the operation plan, the action control processing unit 123 controls an operation of each of the actuators 23a of the actuator group 113 to control an action of the mobile object 11.

In step S164, it is determined whether or not termination has been instructed. In a case where it is determined that termination has not been instructed, the processing returns to step S151. That is, the processing of steps S151 to S164 is repeated until termination is instructed, and the mobile object 11 continues to travel autonomously in the self-position indeterminate mode on the basis of the current information-based self-position.

On the other hand, in a case where termination has been instructed in step S164, the autonomous traveling control processing ends. That is, in this case, the autonomous traveling control processing ends in the self-position indeterminate mode.

Furthermore, in step S157, in a case where the similarity is higher than the predetermined threshold and the non-feature region feature amount obtained in advance from the estimated current information-based self-position matches the non-feature region feature amount obtained from the depth image on the basis of the place-related non-feature portion obtained in association with the current information-based self-position, the current information-based self-position can be regarded as being equal to or higher than the predetermined accuracy. Thus, the processing returns to step S131 in FIG. 15, the operation changes from the self-position indeterminate mode back to the normal mode, and the following processing is repeated.

That is, since the time-series information-based self-position cannot be used to acquire an absolute position, in a case where the self-position has become indeterminate, it is necessary to use, at least once, the current information-based self-position to acquire the absolute position. For this reason, by the above processing, in a case where the self-position has become indeterminate, the current information-based self-position is used as a self-position estimation result until a state is achieved in which the current information-based self-position can be used to acquire the absolute position with predetermined accuracy, and then, after the accuracy of the self-position estimation result has reached a certain level, the self-position is estimated by using also the time-series information-based self-position.

Note that, in the example described above, in the current information-based self-position estimation processing, a depth image is generated by the depth image generation unit 220 from a stereo image captured by the stereo camera 203, a mask corresponding to a place-related non-feature portion is applied to the depth image, an image feature amount is extracted, and associated and registered positional information is read out from the position/image feature amount DB 225 to estimate a current information-based self-position. Alternatively, the current information-based self-position may be estimated by using, for example, three-dimensional point cloud data using a LIDAR as a three-dimensional image, instead of using the stereo camera 203.

Furthermore, a depth image may be generated by using a combination of a two-dimensional image and a time of flight (ToF) sensor to estimate the current information-based self-position.

5. Example of Execution by Software

Incidentally, the series of pieces of processing described above can be executed not only by hardware but also by software. In a case where the series of pieces of processing is executed by software, a program constituting the software is installed from a recording medium into a computer built in dedicated hardware, or a general-purpose computer capable of executing various functions with various programs installed therein, for example.

Figure 17:
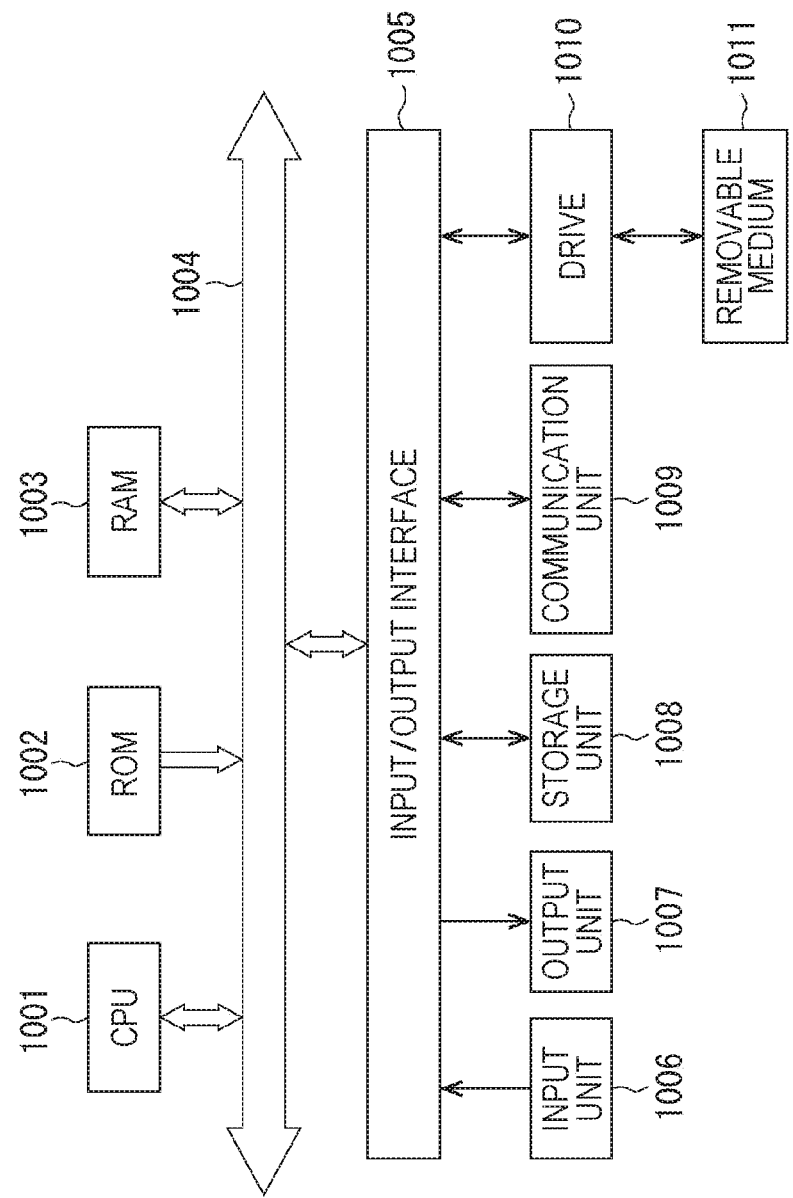
FIG. 17 is a diagram illustrating a configuration example of a general-purpose computer.

FIG. 17 illustrates a configuration example of the general-purpose computer. This personal computer has a built-in central processing unit (CPU) 1001. The CPU 1001 is connected with an input/output interface 1005 via a bus 1004. The bus 1004 is connected with a read only memory (ROM) 1002 and a random access memory (RAM) 1003.

The input/output interface 1005 is connected with an input unit 1006, an output unit 1007, a storage unit 1008, and a communication unit 1009. The input unit 1006 includes an input device such as a keyboard and a mouse used by a user to input an operation command. The output unit 1007 outputs a processing operation screen and an image of a processing result to a display device. The storage unit 1008 includes a hard disc drive or the like for storing programs and various types of data. The communication unit 1009 includes a local area network (LAN) adapter or the like and executes communication processing via a network as represented by the Internet. Furthermore, the input/output interface 1005 is connected with a drive 1010 that reads and writes data from and to a removable medium 1011 such as a magnetic disc (including a flexible disc), an optical disc (including a compact disc-read only memory (CD-ROM) and a digital versatile disc (DVD)), a magneto-optical disc (including Mini Disc (MD)), or a semiconductor memory.

The CPU 1001 executes various types of processing in accordance with a program stored in the ROM 1002 or a program that is read out from the removable medium 1011 such as a magnetic disc, an optical disc, a magneto-optical disc, or a semiconductor memory, installed in the storage unit 1008, and loaded from the storage unit 1008 into the RAM 1003. The RAM 1003 also stores, as appropriate, data or the like necessary for the CPU 1001 to execute various types of processing.

To perform the series of pieces of processing described above, the computer configured as described above causes the CPU 1001 to, for example, load a program stored in the storage unit 1008 into the RAM 1003 via the input/output interface 1005 and the bus 1004 and then execute the program.

The program to be executed by the computer (CPU 1001) can be provided by, for example, being recorded on the removable medium 1011 as a package medium or the like. Furthermore, the program can be provided via a wired or wireless transmission medium such as a local area network, the Internet, or digital satellite broadcasting.

Inserting the removable medium 1011 into the drive 1010 allows the computer to install the program into the storage unit 1008 via the input/output interface 1005. Furthermore, the program can be received by the communication unit 1009 via a wired or wireless transmission medium and installed into the storage unit 1008. Alternatively, the program can be installed in advance in the ROM 1002 or the storage unit 1008.

Note that the program to be executed by the computer may be a program that performs the pieces of processing in a time-series order as described in the present specification, or may be a program that performs the pieces of processing in parallel or when needed, for example, when the processing is called.

Note that the CPU 1001 in FIG. 17 implements the function of the autonomous traveling control unit 110 in FIG. 3. Furthermore, the storage unit 1008 in FIG. 17 constitutes the storage unit 109 in FIG. 3.

Furthermore, in the present specification, a system means a set of a plurality of components (devices, modules (parts), and the like), and it does not matter whether or not all components are in the same housing. Consequently, a plurality of devices housed in separate housings and connected via a network, and one device having a plurality of modules housed in one housing are both systems.

Note that embodiments of the present disclosure are not limited to the embodiments described above, and can be modified in various ways within a scope of the present disclosure.

For example, the present disclosure can have a cloud computing configuration in which a plurality of devices shares one function and collaborates in processing via a network.

Furthermore, each step described in the above-described flowcharts can be executed by one device or can be shared by a plurality of devices.

Moreover, in a case where a plurality of types of processing is included in one step, the plurality of types of processing included in that step can be executed by one device, or can be shared by a plurality of devices.

Note that the present disclosure can also be configured as described below.

<1> A control device including:
a self-position estimation unit that estimates a self-position;
an imaging unit that captures an image of surroundings;
a first mask generation unit that generates a mask for the image of the surroundings on the basis of a place-related non-feature portion representing an area, in the image of the surroundings, that is not useful for identifying the self-position;
a first feature amount extraction unit that extracts an image feature amount from the image of the surroundings to which the mask has been added by the first mask generation unit; and
a registration unit that registers, as a database, the image feature amount in association with positional information regarding a self-position estimated by the self-position estimation unit.

<2> The control device according to <1>, in which
the first mask generation unit generates a mask for a non-feature region that is an area, in the image of the surroundings, that is not useful for identifying the self-position, in accordance with a place corresponding to the self-position, on the basis of a place-related non-feature portion representing an area, in the image of the surroundings, that is not useful for identifying the self-position.

<3> The control device according to <2>, further including:
a place-related non-feature portion database in which the place-related non-feature portion is registered in association with the place,
in which the first mask generation unit generates a mask for a non-feature region that is an area, in the image of the surroundings, that is not useful for identifying the self-position, on the basis of the place-related non-feature portion registered in the place-related non-feature portion database in association with a place corresponding to the self-position.

<4> The control device according to any one of <1> to <3>, in which
the first feature amount extraction unit extracts an image feature amount from the image of the surroundings captured by the imaging unit, and
a current information-based self-position estimation unit that estimates, as a current information-based self-position, the positional information registered in the database in association with the image feature amount is further included.

<5> The control device according to <4>, further including:
an integration unit that integrates and outputs, as a self-position estimation result, a current information-based self-position estimated by the current information-based self-position estimation unit and a self-position estimated by the self-position estimation unit,
in which the integration unit registers, in the database, the self-position estimation result and an image feature amount extracted by the first feature amount extraction unit in association with each other.

<6> The control device according to <5>, further including:
a place-related non-feature portion database in which the place-related non-feature portion is registered in association with a place corresponding to the self-position; and
a place-related non-feature portion generation/registration unit that generates an area as a new piece of the place-related non-feature portion in association with the same place, the area including statistically similar image feature amounts from among a plurality of the image feature amounts at the same place identified on the basis of a position registered in the database, and registers the place-related non-feature portion in the place-related non-feature portion database.

<7> The control device according to <5>, further including:
a second mask generation unit that generates, on the basis of a place-related non-feature portion representing an area, in the image of the surroundings, that is not useful for identifying a self-position, a mask for a feature region that is an area, in the image of the surroundings, that is not useful for identifying the self-position;
a second feature amount extraction unit that extracts, as a non-feature region feature amount, an image feature amount from the image of the surroundings to which the mask has been added by the second mask generation unit;
a position/non-feature region feature amount database registration unit that registers, in a position/non-feature region feature amount database, the non-feature region feature amount in association with positional information regarding a self-position estimated by the self-position estimation unit;

a non-feature region feature amount extraction unit that extracts a non-feature region feature amount for the image of the surroundings on the basis of a place-related non-feature portion of a place corresponding to the current information-based self-position; and a check unit that checks the current information-based self-position on the basis of a similarity between the non-feature region feature amount extracted by the non-feature region feature amount extraction unit and the non-feature region feature amount registered in the position/non-feature region feature amount database in association with the current information-based self-position.

<8> The control device according to <7>, further including:

a self-position indeterminate state determination unit that determines whether or not a self-position is indeterminate on the basis of a time-series change amount of a self-position estimation result output from the integration unit, or on the basis of whether or not power has turned on, in which in a case where the self-position is indeterminate, the integration unit outputs the current information-based self-position as a self-position estimation result, the check unit checks the current information-based self-position on the basis of a similarity between the non-feature region feature amount extracted by the non-feature region feature amount extraction unit and the non-feature region feature amount registered in the position/non-feature region feature amount database in association with the current information-based self-position, in a case where the similarity is lower than a predetermined threshold, it is determined that the self-position is indeterminate, and the integration unit outputs the current information-based self-position as a self-position estimation result, and in a case where the similarity is higher than the predetermined threshold, it is determined that the self-position is no longer indeterminate, and the integration unit integrates the current information-based self-position estimated by the current information-based self-position estimation unit and a self-position estimated by the self-position estimation unit, and outputs an integration result as a self-position estimation result.

<9> The control device according to any one of <1> to <8>, in which the place-related non-feature portion is constituted by a table containing a place corresponding to the self-position and a place-related non-feature portion.

<10> The control device according to <9>, in which the place-related non-feature portion is constituted by a table containing a place corresponding to the self-position and a place attribute, which is an abstraction of the place, and a table containing the place attribute and the place-related non-feature portion.

<11> The control device according to any one of <1> to <10>, in which the imaging unit is a stereo camera, the image of the surroundings captured by the stereo camera is a stereo image, a depth image generation unit configured to generate a depth image on the basis of the stereo image is further included, the first mask generation unit generates a mask for the image of the surroundings including the depth image on the basis of a place-related non-feature portion representing an area, in the image of the surroundings, that is not useful for identifying the self-position in accordance with a place corresponding to the self-position, and the first feature amount extraction unit extracts an image feature amount from the image of the surroundings including the depth image with the mask added.

<12> The control device according to any one of <1> to <11>, in which the self-position estimation unit includes a time-series information-based self-position estimation unit that estimates the self-position by using time-series information including sensor information supplied in a time-series order and outputs an estimation result as a time-series information-based self-position.

<13> The control device according to <12>, in which the time-series information is three-dimensional point cloud data detected by a light detection and ranging or laser imaging detection and ranging (LIDAR), and positional information, a posture, a velocity, an acceleration, and an angular velocity detected by a wheel encoder.

<14> A control method including:

self-position estimation processing of estimating a self-position;

imaging processing of capturing an image of surroundings;

first mask generation processing of generating a mask for the image of the surroundings on the basis of a place-related non-feature portion representing an area, in the image of the surroundings, that is not useful for identifying the self-position;

first feature amount extraction processing of extracting an image feature amount from the image of the surroundings to which the mask has been added by the first mask generation processing; and registration processing of registering, as a database, the image feature amount in association with positional information regarding the self-position estimated by the self-position estimation processing.

<15> A program that causes a computer to function as:

a self-position estimation unit that estimates a self-position;

an imaging unit that captures an image of surroundings;

a first mask generation unit that generates a mask for the image of the surroundings on the basis of a place-related non-feature portion representing an area, in the image of the surroundings, that is not useful for identifying the self-position;

a first feature amount extraction unit that extracts an image feature amount from the image of the surroundings to which the mask has been added by the first mask generation unit; and a registration unit that registers, as a database, the image feature amount in association with positional information regarding a self-position estimated by the self-position estimation unit.

<16> A mobile object including:

a self-position estimation unit that estimates a self-position;

an imaging unit that captures an image of surroundings;
a first mask generation unit that generates a mask for the image of the surroundings on the basis of a place-related non-feature portion representing an area, in the image of the surroundings, that is not useful for identifying the self-position;
a first feature amount extraction unit that extracts an image feature amount from the image of the surroundings to which the mask has been added by the first mask generation unit; and
a registration unit that registers, as a database, the image feature amount in association with positional information regarding a self-position estimated by the self-position estimation unit.

<17> A control device further including:
a self-position estimation unit that estimates a self-position;
an imaging unit that captures an image of surroundings;
a mask generation unit that generates a mask for the image of the surroundings on the basis of a place-related non-feature portion representing an area, in the image of the surroundings, that is not useful for identifying the self-position;
a feature amount extraction unit that extracts an image feature amount from the image of the surroundings to which the mask has been added by the mask generation unit;
a registration unit that registers, as a database, the image feature amount in association with positional information regarding a self-position estimated by the self-position estimation unit; and
a current information-based self-position estimation unit that estimates a current information-based self-position on the basis of the database,
in which in a case of estimating the current information-based self-position,
the feature amount extraction unit extracts the image feature amount from the image of the surroundings captured by the imaging unit, and
the current information-based self-position estimation unit estimates, as a current information-based self-position, the positional information registered in the database in association with the image feature amount extracted by the feature amount extraction unit.

<18> A control method further including:
self-position estimation processing of estimating a self-position;
imaging processing of capturing an image of surroundings;
mask generation processing of generating a mask for the image of the surroundings on the basis of a place-related non-feature portion representing an area, in the image of the surroundings, that is not useful for identifying the self-position;
feature amount extraction processing of extracting an image feature amount from the image of the surroundings to which the mask has been added by the mask generation processing;
registration processing of registering, as a database, the image feature amount in association with positional information regarding a self-position estimated by the self-position estimation processing; and
current information-based self-position estimation processing of estimating a current information-based self-position on the basis of the database,
in which in a case of estimating the current information-based self-position,
the feature amount extraction processing extracts the image feature amount from the image of the surroundings captured by the imaging processing, and
the current information-based self-position estimation processing estimates, as a current information-based self-position, the positional information registered in the database in association with the image feature amount extracted by the feature amount extraction processing.

<19> A program that causes a computer to function as:
a self-position estimation unit that estimates a self-position;
an imaging unit that captures an image of surroundings;
a mask generation unit that generates a mask for the image of the surroundings on the basis of a place-related non-feature portion representing an area, in the image of the surroundings, that is not useful for identifying the self-position;
a feature amount extraction unit that extracts an image feature amount from the image of the surroundings to which the mask has been added by the mask generation unit;
a registration unit that registers, in a database, the image feature amount in association with positional information regarding a self-position estimated by the self-position estimation unit; and
a current information-based self-position estimation unit that estimates a current information-based self-position on the basis of the database,
in which in a case of estimating the current information-based self-position,
the feature amount extraction unit extracts the image feature amount from the image of the surroundings captured by the imaging unit, and
the current information-based self-position estimation unit estimates, as a current information-based self-position, the positional information registered in the database in association with the image feature amount extracted by the feature amount extraction unit.

<20> A mobile object further including:
a self-position estimation unit that estimates a self-position;
an imaging unit that captures an image of surroundings;
a mask generation unit that generates a mask for the image of the surroundings on the basis of a place-related non-feature portion representing an area, in the image of the surroundings, that is not useful for identifying the self-position;
a feature amount extraction unit that extracts an image feature amount from the image of the surroundings to which the mask has been added by the mask generation unit;
a registration unit that registers, as a database, the image feature amount in association with positional information regarding a self-position estimated by the self-position estimation unit; and
a current information-based self-position estimation unit that estimates a current information-based self-position on the basis of the database,
in which in a case of estimating the current information-based self-position,
the feature amount extraction unit extracts the image feature amount from the image of the surroundings captured by the imaging unit, and
the current information-based self-position estimation unit estimates, as a current information-based self-position, the positional information registered in the database in association with the image feature amount extracted by the feature amount extraction unit.

REFERENCE SIGNS LIST

11 Mobile object
21 Sensor group
21a and 21a-1 to 21a-n Sensor
22 Autonomous traveling control unit
23 Actuator group
23a and 23a-1 to 23a-n Actuator
31 Recognition processing unit
32 Action plan processing unit
33 Action control processing unit
41 Route planning unit
42 Action planning unit
43 Operation planning unit
102 Data acquisition unit
105 Output control unit
106 Output unit
107 Drive system control unit
108 Drive system
110 Autonomous traveling control unit
112 Sensor group
113 Actuator group
121 Recognition processing unit
122 Action plan processing unit
123 Action control processing unit
134 Planning unit
161 Route planning unit
162 Action planning unit
163 Operation planning unit
201 LIDAR
202 Wheel encoder
203 Stereo camera
220 Depth image generation unit
221 Time-series information-based self-position estimation unit
222 Time-series information DB
223 Feature amount extraction unit
224 Current information-based self-position estimation unit
225 Position/image feature amount DB
226 Self-position estimation result integration unit
227 Non-feature region mask generation unit
228 Place-related non-feature portion DB
229 Position/image feature amount registration unit
230 Position/place conversion unit
241 Place-related non-feature portion generation/registration unit
251 Non-feature region feature amount extraction unit
252 Self-position check unit
253 Feature region mask generation unit
254 Feature amount extraction unit
255 Position/non-feature region feature amount registration unit
256 Position/non-feature region feature amount DB
257 Position/place conversion unit
271 Self-position indeterminate state determination unit

The invention claimed is:

1. A control device, comprising:
a self-position estimation unit configured to estimate a self-position of a mobile object;
an imaging unit configured to capture an image of surroundings of the mobile object;
a first mask generation unit configured to:
generate a first mask for the image of the surroundings based on a place-related non-feature portion representing a first area, in the image of the surroundings, that is not useful for the estimation of the self-position; and
add the first mask, in the first area, to the image of the surroundings based on the place-related non-feature portion;
a first feature amount extraction unit configured to extract a first image feature amount of a plurality of image feature amounts from the image of the surroundings to which the first mask has been added by the first mask generation unit;
a registration unit configured to register, in a database, the first image feature amount in association with positional information regarding the self-position estimated by the self-position estimation unit;
a place-related non-feature portion database in which the place-related non-feature portion is registered in association with a place corresponding to the self-position; and
a place-related non-feature portion generation/registration unit configured to:
generate a second area as a new piece of the place-related non-feature portion in association with the same place,
wherein the second area includes statistically similar image feature amounts from the plurality of image feature amounts at the same place that is identified based on the self-position registered in the database; and
register the second area as the new piece of the place-related non-feature portion in the place-related non-feature portion database,
wherein the place-related non-feature portion database is different from the database.

2. The control device according to claim 1, wherein the first mask generation unit is further configured to generate the first mask for the place-related non-feature portion based on the place corresponding to the self-position.

3. The control device according to claim 2,
wherein the first mask generation unit is further configured to generate the first mask based on the place-related non-feature portion registered in the place-related non-feature portion database in association with the place corresponding to the self-position.

4. The control device according to claim 1, further comprising a current information-based self-position estimation unit configured to estimate, as a current information-based self-position, the positional information registered in the database in association with the first image feature amount.

5. The control device according to claim 4, further comprising an integration unit configured to:
integrate and output, as a self-position estimation result, the current information-based self-position estimated by the current information-based self-position estimation unit and the self-position estimated by the self-position estimation unit, and
register, in the database, the self-position estimation result in association with the first image feature amount extracted by the first feature amount extraction unit.

6. The control device according to claim 5, further comprising:
a second mask generation unit configured to:
generate, based on the place-related non-feature portion, a second mask for a feature region that is a third area, in the image of the surroundings, that is not useful for the estimation of the self-position; and
add the second mask, in the third area, to the image of the surroundings based on the place-related non-feature portion;
a second feature amount extraction unit configured to extract, as a first non-feature region feature amount, a second image feature amount of the plurality of image feature amounts from the image of the surroundings to which the second mask has been added by the second mask generation unit;
a position/non-feature region feature amount database registration unit configured to register, in a position/non-feature region feature amount database, the first non-feature region feature amount in association with the positional information which is associated with the self-position;
a non-feature region feature amount extraction unit configured to extract a second non-feature region feature amount for the image of the surroundings based on the place-related non-feature portion of a place corresponding to the current information-based self-position; and
a check unit configured to check the current information-based self-position based on a similarity between the first non-feature region feature amount and the second non-feature region feature amount.

7. The control device according to claim 6, further comprising a self-position indeterminate state determination unit configured to determine the self-position is one of indeterminate or not indeterminate based on at least one of a time-series change amount of the self-position estimation result output from the integration unit, or whether power has turned on, wherein
in a case where the self-position is indeterminate,
the integration unit is further configured to output the current information-based self-position as the self-position estimation result, and
the check unit is further configured to check the current information-based self-position based on the similarity between the first non-feature region feature amount and the second non-feature region feature amount, wherein the determination that the self-position is indeterminate is based on the similarity that is lower than a specific threshold, and
in a case where the self-position is not indeterminate, the integration unit is further configured to:
integrate the current information-based self-position and the self-position, and
output an integration result as the self-position estimation result,
wherein the determination that the self-position is not indeterminate is based on the similarity that is higher than the specific threshold.

8. The control device according to claim 1, further comprising a table containing a place corresponding to the self-position in association with the place-related non-feature portion.

9. The control device according to claim 1, further comprising:
a first table containing a place corresponding to the self-position and a place attribute, wherein the place attribute is an abstraction of the place; and
a second table containing the place attribute and the place-related non-feature portion.

10. The control device according to claim 1, wherein the imaging unit is a stereo camera,
the image of the surroundings is a stereo image,
the control device further comprises a depth image generation unit configured to generate a depth image based on the stereo image,
the first mask generation unit is further configured to generate the first mask for the image of the surroundings including the depth image based on the place-related non-feature portion, and
the first feature amount extraction unit is further configured to extract the first image feature amount from the image of the surroundings including the depth image with the first mask added.

11. The control device according to claim 1, wherein the self-position estimation unit includes a time-series information-based self-position estimation unit configured to:
estimate the self-position by using time-series information, wherein the time-series information includes sensor information supplied in a time-series order from at least one sensor, and
output an estimation result as a time-series information-based self-position.

12. The control device according to claim 11, wherein the time-series information includes
three-dimensional point cloud data detected by one of a light detection and ranging or a laser imaging detection and ranging (LIDAR),
the positional information detected by a wheel encoder,
a posture of the mobile object detected by the wheel encoder,
a velocity of the mobile object detected by the wheel encoder,
an acceleration of the mobile object detected by the wheel encoder, and
an angular velocity of the mobile object detected by the wheel encoder.

13. A control method, comprising:
estimating a self-position of a mobile object;
capturing an image of surroundings of the mobile object;
generating a mask for the image of the surroundings based on a place-related non-feature portion representing an area, in the image of the surroundings, that is not useful for the estimation of the self-position;
adding the mask, in the area, to the image of the surroundings based on the place-related non-feature portion;
extracting an image feature amount of a plurality of image feature amounts from the image of the surroundings to which the/mask has been added;
registering, in a database, the image feature amount in association with positional information regarding the self-position;
registering, in a place-related non-feature portion database, the place-related non-feature portion in association with a place corresponding to the self-position;
generating a second area as a new piece of the place-related non-feature portion in association with the same place,
wherein the second area includes statistically similar image feature amounts from the plurality of image feature amounts at the same place that is identified based on the self-position registered in the database; and
registering, in the place-related non-feature portion database, the second area as the new piece of the place-related non-feature portion,
wherein the place-related non-feature portion database is different from the database.

14. A non-transitory computer-readable medium having stored thereon, computer-executable instructions which, when executed by a processor, cause the processor to execute operations, the operations comprising:
  estimating a self-position of a mobile object;
  capturing an image of surroundings of the mobile object;
  generating a mask for the image of the surroundings based on a place-related non-feature portion representing an area, in the image of the surroundings, that is not useful for the estimation of the self-position;
  adding the mask, in the area, to the image of the surroundings based on the place-related non-feature portion;
  extracting an image feature amount of a plurality of image feature amounts from the image of the surroundings to which the mask has been added;
  registering, in a database, the image feature amount in association with positional information regarding the self-position;
  registering, in a place-related non-feature portion database, the place-related non-feature portion in association with a place corresponding to the self-position;
  generating a second area as a new piece of the place-related non-feature portion in association with the same place,
    wherein the second area includes statistically similar image feature amounts from the plurality of image feature amounts at the same place that is identified based on the self-position registered in the database; and
  registering, in the place-related non-feature portion database, the second area as the new piece of the place-related non-feature portion,
  wherein the place-related non-feature portion database is different from the database.

15. A mobile object, comprising:
  a self-position estimation unit configured to estimate a self-position of the mobile object;
  an imaging unit configured to capture an image of surroundings of the mobile object;
  a first mask generation unit configured to:
    generate a mask for the image of the surroundings based on a place-related non-feature portion representing an area, in the image of the surroundings, that is not useful for the estimation of the self-position; and
    add the mask, in the area, to the image of the surroundings based on the place-related non-feature portion;
  a first feature amount extraction unit configured to extract an image feature amount of a plurality of image feature amounts from the image of the surroundings to which the mask has been added by the first mask generation unit;
  a registration unit configured to register, in a database, the image feature amount in association with positional information regarding the self-position estimated by the self-position estimation unit;
  a place-related non-feature portion database in which the place-related non-feature portion is registered in association with a place corresponding to the self-position; and
  a place-related non-feature portion generation/registration unit configured to:
    generate a second area as a new piece of the place-related non-feature portion in association with the same place,
      wherein the second area includes statistically similar image feature amounts from the plurality of image feature amounts at the same place that is identified based on the self-position registered in the database; and
    register the second area as the new piece of the place-related non-feature portion in the place-related non-feature portion database,
    wherein the place-related non-feature portion database is different from the database.

16. A control device, comprising:
  a self-position estimation unit configured to estimate a self-position of a mobile object;
  an imaging unit configured to capture an image of surroundings of the mobile object;
  a mask generation unit configured to:
    generate a mask for the image of the surroundings based on a place-related non-feature portion representing an area, in the image of the surroundings, that is not useful for the estimation of the self-position; and
    add the mask, in the area, to the image of the surroundings based on the place-related non-feature portion;
  a feature amount extraction unit configured to extract an image feature amount of a plurality of image feature amounts from the image of the surroundings to which the mask has been added by the mask generation unit;
  a registration unit configured to register, in a database, the image feature amount in association with positional information regarding the self-position estimated by the self-position estimation unit;
  a current information-based self-position estimation unit configured to estimate a current information-based self-position, based on the database, as the positional information registered in the database in association with the image feature amount extracted by the feature amount extraction unit;
  an integration unit configured to:
    integrate and output, as a self-position estimation result, the current information-based self-position estimated by the current information-based self-position estimation unit and the self-position estimated by the self-position estimation unit; and
    register, in the database, the self-position estimation result in association with the image feature amount extracted by the feature amount extraction unit;
  a place-related non-feature portion database in which the place-related non-feature portion is registered in association with a place corresponding to the self-position; and
  a place-related non-feature portion generation/registration unit configured to:
    generate a second area as a new piece of the place-related non-feature portion in association with the same place,
      wherein the second area includes statistically similar image feature amounts from the plurality of image feature amounts at the same place that is identified based on the self-position registered in the database; and
    register the second area as the new piece of the place-related non-feature portion in the place-related non-feature portion database,
    wherein the place-related non-feature portion database is different from the database.

17. A control method, comprising:
estimating a self-position of a mobile object;
capturing an image of surroundings of the mobile object;
generating a mask for the image of the surroundings based on a place-related non-feature portion representing an area, in the image of the surroundings, that is not useful for the estimation of the self-position;
adding the mask, in the area, to the image of the surroundings based on the place-related non-feature portion;
extracting an image feature amount of a plurality of image feature amounts from the image of the surroundings to which the mask has been added;
registering, in a database, the image feature amount in association with positional information regarding the self-position;
estimating a current information-based self-position, based on the database, as the positional information registered in the database in association with the image feature amount;
integrating and outputting, as a self-position estimation result, the current information-based self-position and the self-position;
registering, in the database, the self-position estimation result in association with the extracted image feature amount;
registering, in a place-related non-feature portion database, the place-related non-feature portion in association with a place corresponding to the self-position;
generating a second area as a new piece of the place-related non-feature portion in association with the same place,
wherein the second area includes statistically similar image feature amounts from the plurality of image feature amounts at the same place that is identified based on the self-position registered in the database; and
registering, in the place-related non-feature portion database, the second area as the new piece of the place-related non-feature portion,
wherein the place-related non-feature portion database is different from the database.

18. A non-transitory computer-readable medium having stored thereon, computer-executable instructions which, when executed by a processor, cause the processor to execute operations, the operations comprising:
estimating a self-position of a mobile object;
capturing an image of surroundings of the mobile object;
generating a mask for the image of the surroundings based on a place-related non-feature portion representing an area, in the image of the surroundings, that is not useful for the estimation of the self-position;
adding the mask, in the area, to the image of the surroundings based on the place-related non-feature portion;
extracting an image feature amount of a plurality of image feature amounts from the image of the surroundings to which the mask has been added;
registering, in a database, the image feature amount in association with positional information regarding the self-position;
estimating a current information-based self-position, based on the database, as the positional information registered in the database in association with the image feature amount;
integrating and outputting, as a self-position estimation result, the current information-based self-position and the self-position;
registering, in the database, the self-position estimation result in association with the extracted image feature amount;
registering, in a place-related non-feature portion database, the place-related non-feature portion in association with a place corresponding to the self-position;
generating a second area as a new piece of the place-related non-feature portion in association with the same place,
wherein the second area includes statistically similar image feature amounts from the plurality of image feature amounts at the same place that is identified based on the self-position registered in the database; and
registering, in the place-related non-feature portion database, the second area as the new piece of the place-related non-feature portion,
wherein the place-related non-feature portion database is different from the database.

19. A mobile object, comprising:
a self-position estimation unit configured to estimate a self-position of the mobile object;
an imaging unit configured to capture an image of surroundings of the mobile object;
a mask generation unit configured to:
generate a mask for the image of the surroundings based on a place-related non-feature portion which represents an area, in the image of the surroundings, that is not useful for the estimation of the self-position; and
add the mask, in the area, to the image of the surroundings based on the place-related non-feature portion;
a feature amount extraction unit configured to extract an image feature amount of a plurality of image feature amounts from the image of the surroundings to which the mask has been added by the mask generation unit;
a registration unit configured to register, in a database, the image feature amount in association with positional information regarding the self-position estimated by the self-position estimation unit;
a current information-based self-position estimation unit configured to estimate a current information-based self-position, based on the database, as the positional information registered in the database in association with the image feature amount extracted by the feature amount extraction unit;
an integration unit configured to:
integrate and output, as a self-position estimation result, the current information-based self-position estimated by the current information-based self-position estimation unit and the self-position estimated by the self-position estimation unit; and
register, in the database, the self-position estimation result in association with the image feature amount extracted by the feature amount extraction unit;
a place-related non-feature portion database in which the place-related non-feature portion is registered in association with a place corresponding to the self-position; and
a place-related non-feature portion generation/registration unit configured to:
generate a second area as a new piece of the place-related non-feature portion in association with the same place, wherein the second area includes statistically similar image feature amounts from the plurality of image feature amounts at the same place that is identified based on the self-position registered in the database; and
register the second area as the new piece of the place-related non-feature portion in the place-related non-feature portion database,
wherein the place-related non-feature portion database is different from the database.

* * * * *